(12) United States Patent
Nordin et al.

(10) Patent No.: US 6,804,446 B1
(45) Date of Patent: Oct. 12, 2004

(54) WAVEGUIDE INCLUDING AT LEAST ONE PHOTONIC CRYSTAL REGION FOR DIRECTING SIGNALS PROPAGATING THERETHROUGH

(75) Inventors: Gregory P. Nordin, Huntsville, AL (US); Seunghyun Kim, Huntsville, AL (US); Jingbo Cai, Huntsville, AL (US); Jianhua Jiang, Madison, AL (US)

(73) Assignee: University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 10/715,966

(22) Filed: Nov. 18, 2003

(51) Int. Cl.[7] .................................................. G02B 6/10
(52) U.S. Cl. ........................ 385/132; 385/129; 385/125
(58) Field of Search ................................ 385/129, 132, 385/123–126

(56) References Cited

U.S. PATENT DOCUMENTS 6,134,369 A * 10/2000 Kurosawa ................... 385/132
2002/0048422 A1 * 4/2002 Cotteverte et al. ............ 385/4
2003/0142902 A1 * 7/2003 Sugitatsu ..................... 385/27
2003/0174961 A1 * 9/2003 Hamada ...................... 385/48
2004/0013384 A1 * 1/2004 Parker et al. ................ 385/129

* cited by examiner

Primary Examiner—John D Lee
Assistant Examiner—Eric Wong
(74) Attorney, Agent, or Firm—Alston & Bird LLP

(57) ABSTRACT

A waveguide assembly is provided that includes a waveguide region and at least one photonic crystal (PhC) region. The waveguide region includes a longitudinally extending core that has an input channel and at least one output channel, and a cladding at least partially surrounding the core for confining signals within the core. The PhC region(s), in turn, extend laterally through at least a portion of the core to at least partially direct signals propagating through the core. The PhC region(s) can extend through at least a portion of the core to thereby form, for example, a bend, beamsplitter, polarizing beamsplitter, Mach-Zender interferometer or ring resonator for signals propagating through the core.

34 Claims, 22 Drawing Sheets

WAVEGUIDE INCLUDING AT LEAST ONE PHOTONIC CRYSTAL REGION FOR DIRECTING SIGNALS PROPAGATING THERETHROUGH

FEDERALLY SPONSORED RESEARCH OR DEVELOPMENT

This invention was made with government support under Grant No. N66001-01-8938 awarded by the Defense Advanced Research Projects Agency (DARPA), and Grant No. EPS-0091853 awarded by the National Science Foundation. The government may have certain rights in this invention.

FIELD OF THE INVENTION

The present invention relates generally to waveguides and, more particularly, relates to waveguides including at least one photonic crystal region for directing signals propagating therethrough such as to form a ninety-degree bend, beamsplitter, polarizing beamsplitter, Mach-Zender interferometer, ring resonator or the like.

BACKGROUND OF THE INVENTION

Conventional waveguides, such as Silica waveguides, composed of a core and a cladding with low refractive index difference are an attractive technology platform for planar lightwave circuits (PLC's) because of their straightforward design for single mode operation, low propagation loss, and low dispersion. One of the research interests in PLC's is to increase their integration level on a single chip. In this regard, compact PLC components are typically required to increase the integration level. But because a relatively large radius of curvature (on the order of mm) is typically necessary to achieve a high efficiency waveguide bend, the sizes of such waveguide-based PLC's are conventionally quite large (cm range), which can limit the possible integration level of such PLC's.

Photonic crystals (PhC's), typically comprising arrays of periodic dielectric material embedded in a homogeneous material, have been the focus of the intense research because PhC's can be used to achieve ultracompact PLC's. In this regard, defects in PhC's, where the periodicity is broken, can support modes for frequencies in the photonic band gap of the PhC's (frequency ranges prohibited from propagation in PhC). Since PhC defect modes are well confined in the defect region, ultracompact waveguide and sharp bend structures can be obtained from PhC's. One such waveguide structure is disclosed by U.S. Pat. No. 6,134,369 to Kurosawa, entitled: *Compact Optical Waveguide*. As disclosed by the Kurosawa patent, an optical waveguide includes a photonic band gap element as a reflector to enable light to be reflected at angles greater than a critical angle. The waveguide of the Kurosawa patent includes a waveguide channel that has a two-dimensional photonic band gap element on each of the inside and outside of a bend in the waveguide channel. In this regard, the two-dimensional photonic band gap elements form reflective surfaces at the corners of the waveguide channel.

Whereas waveguides such as that disclosed by the Kurosawa patent are adequate in realizing a sharp bend, such waveguides have drawbacks. In this regard, it is typically desirable for the PhC's of such conventional PhC waveguides to have a wide band gap to confine signals within the waveguide. Also, as is well known to those skilled in the art, the larger the difference between the refractive indices of the PhC's and the surrounding material, the wider the band gap of the PhC. Conventional PhC waveguides, then, also typically comprise PhC's and surrounding material that have a large difference between their respective refractive indices. Thus, such conventional PhC waveguides typically place undesirable design constraints on the PhC region. In this regard, conventional PhC waveguides typically require PhC regions with a full band gap and, in turn, PhC regions and surrounding material having a large refractive index difference, to thereby efficiently operate.

As will also be appreciated, the incident light mode width of signals propagating in the waveguide region can be wider than the width of the conventional PhC waveguide channel. Conventional PhC waveguides, such as that disclosed by the Kurosawa patent, however, typically only include a PhC region that extends to the boundary of the waveguide channel and surrounding cladding material which, in turn, require coupling of signals from the waveguide into the conventional PhC waveguide. Since signals in the waveguide have to be coupled into the smaller width PhC waveguide to manipulate its propagation direction, conventional PhC waveguides can suffer from loss of the mode tail in the cladding by the scattering of signals with the PhC region.

SUMMARY OF THE INVENTION

In light of the foregoing background, embodiments of the present invention provide an improved waveguide including at least one photonic crystal region for directing signals propagating therethrough. More particularly, embodiments of the present invention provide a waveguide assembly that includes a waveguide region and photonic crystal (PhC) region(s) for directing signals propagating through the waveguide region. In this regard, the PhC region(s) augment the waveguide region to reduce overall device size while preserving the traditional advantages of conventional waveguides, such as straightforward design for single mode operation, low propagation loss, and low dispersion. As described more fully below, embodiments of the present invention can therefore provide waveguide assemblies that can be configured for uses such as high efficiency waveguide bend, beamsplitter, polarizing beamsplitter, a Mach-Zender interferometer or a ring resonator.

According to one aspect of the present invention, a waveguide assembly is provided that includes a waveguide region and at least one photonic crystal (PhC) region. The waveguide region includes a longitudinally extending core that has an input channel and at least one output channel, and a cladding at least partially surrounding the core for confining signals within the core. The PhC region(s), in turn, extend laterally through at least a portion of the core to at least partially direct signals propagating through the core. More particularly, for example, the PhC region(s) can extend through at least a portion of the core to thereby form a bend, beamsplitter, polarizing beamsplitter, Mach-Zender interferometer or ring resonator for signals propagating through the core.

In contrast to the waveguide assembly of this embodiment of the present invention, conventional PhC waveguides, such as that disclosed by the Kurosawa patent, utilize PhC regions that form a portion of the waveguide, typically the bend in the waveguide. By extending the PhC region(s) at least partially through the core, at least a portion of signals propagating through the input channel can become incident at an angle of incidence on a surface of the PhC region(s) in a manner such that the signals can have a wavelength outside a band gap of the PhC region(s). In this regard, the waveguide assembly of embodiments of the present invention is capable of efficiently operating with signals having wavelengths outside the band gap of the PhC region(s). As also described in more detail below, the PhC region(s) can also extend laterally through at least a portion of the cladding. As such, and further in contrast to conventional PhC waveguides, the PhC region(s) can be capable of covering the incident light mode width of a signal propagating through the waveguide region.

Each PhC region can include a boundary layer at a boundary of the PhC region and the core of the waveguide region. In this regard, the boundary layer is capable of being modified to thereby manipulate a diffraction effect caused by a periodicity at the boundary of the at least one PhC region and the core, particularly when the waveguide is configured as a bend. For example, the boundary layer can be modified by changing the radius, periodicity and/or position of holes or posts that make up the boundary layer, and more generally the PhC region(s).

When the waveguide assembly is configured as a polarizing beamsplitter, a portion of the core through which the PhC region(s) extend can be configured to follow a propagation direction of polarized signals propagating through the core. More particularly, a portion of a first output channel through which the PhC region extends can be sloped with respect to an input channel.

Embodiments of the present invention therefore provide an improved waveguide assembly that includes PhC region (s) capable of augmenting a waveguide region to reduce overall device size while preserving the traditional advantages of conventional waveguides. The waveguide assembly can advantageously be configured to operate in any of a number of different manners including, for example, a high efficiency waveguide bend, beamsplitter, polarizing beamsplitter, Mach-Zender interferometer or ring resonator. In contrast to conventional PhC waveguides, the PhC region (s) can extend through a portion of the core of the waveguide region. Also, the waveguide assembly of embodiments of the present invention can efficiently operate with signals outside the band gap of the PhC region(s). In addition, and further in contrast to conventional PhC waveguides, the PhC region(s) can be capable of covering the incident light mode width of a signal propagating through the waveguide region without the increased losses suffered by conventional PhC waveguide from the coupling. As such, the waveguide assembly of embodiments of the present invention solve the problems identified by prior waveguides and provide additional advantages.

BRIEF DESCRIPTION OF THE DRAWINGS

Figure 1A:
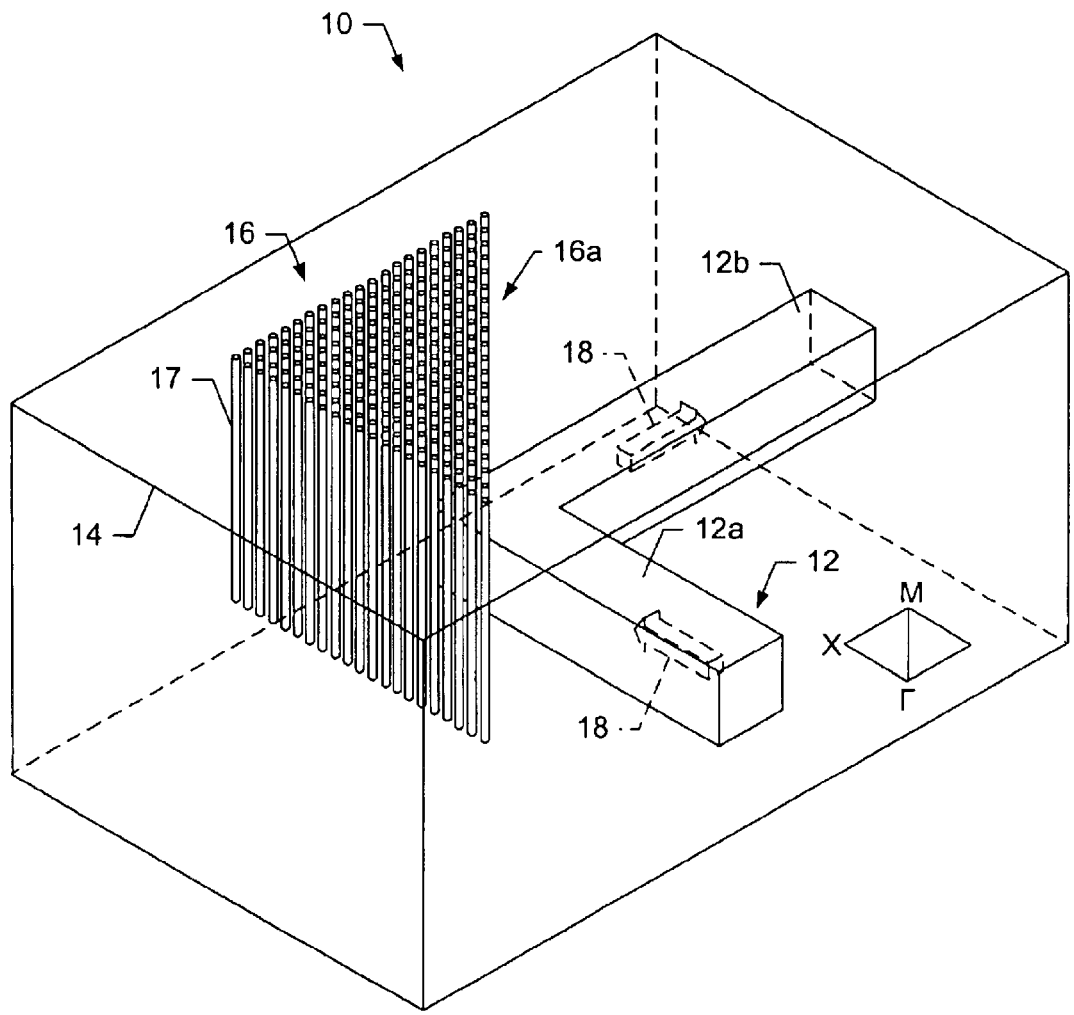
Figure 1B:
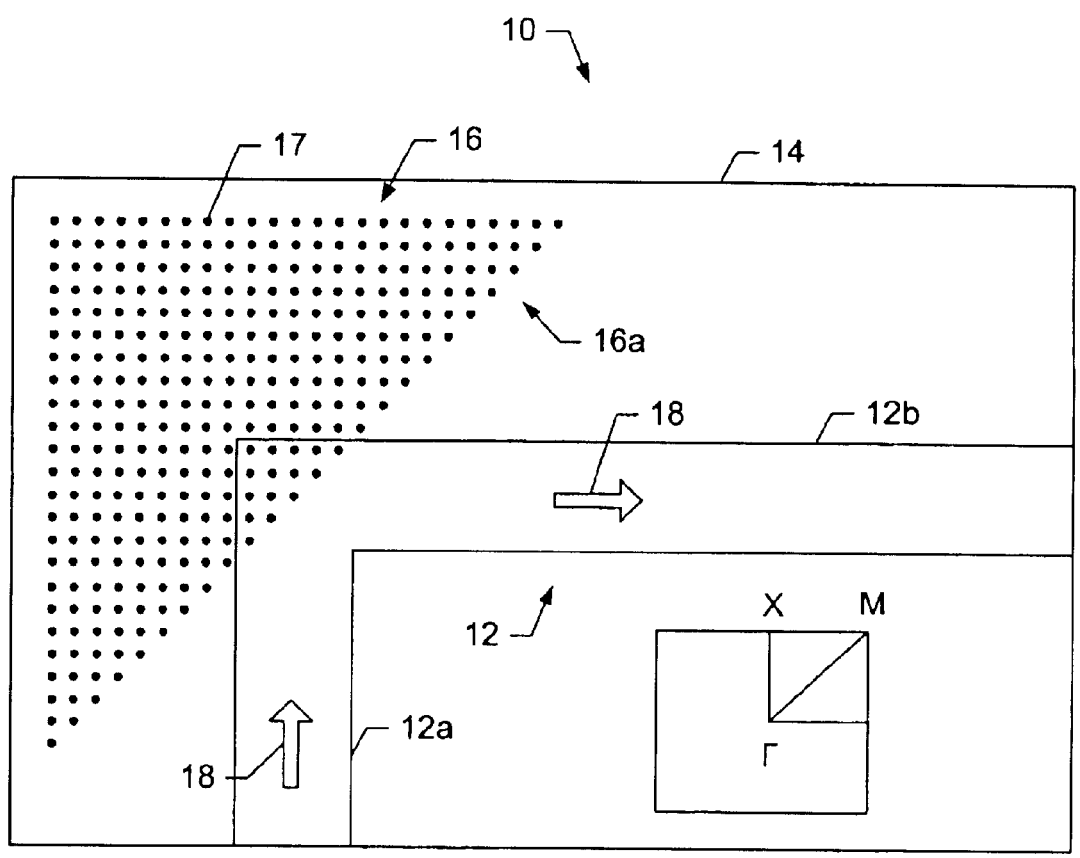
Figure 2:
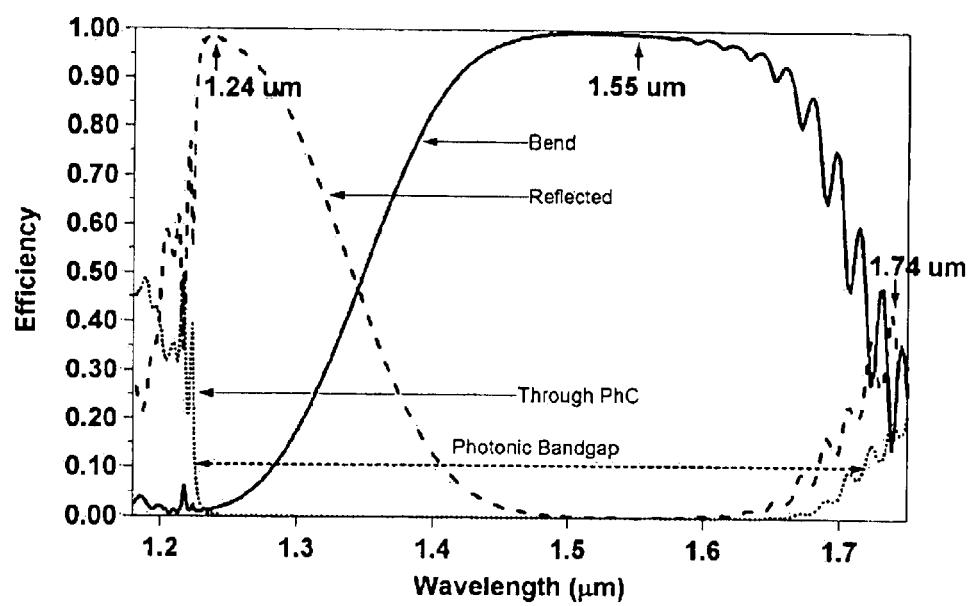
Figure 3:
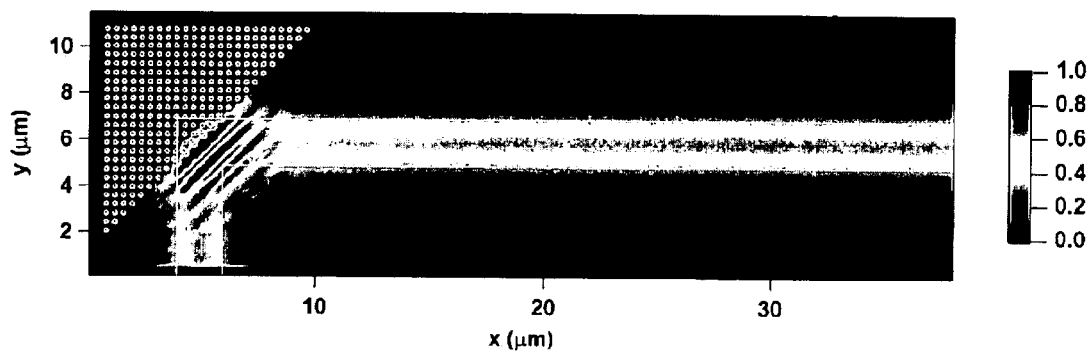
Figure 4:
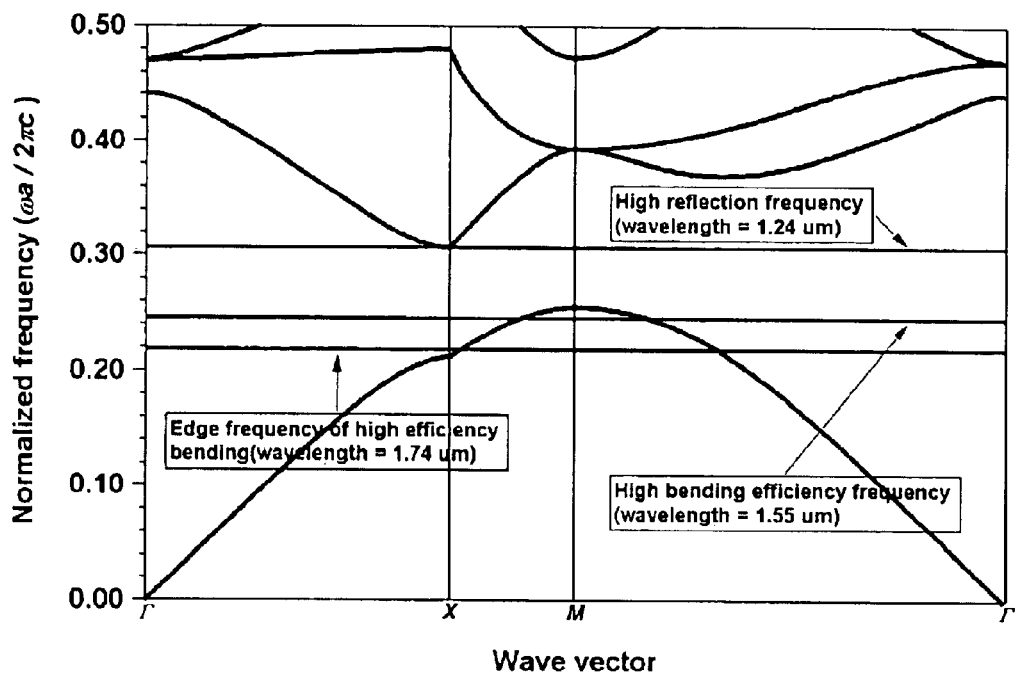
Figure 5:
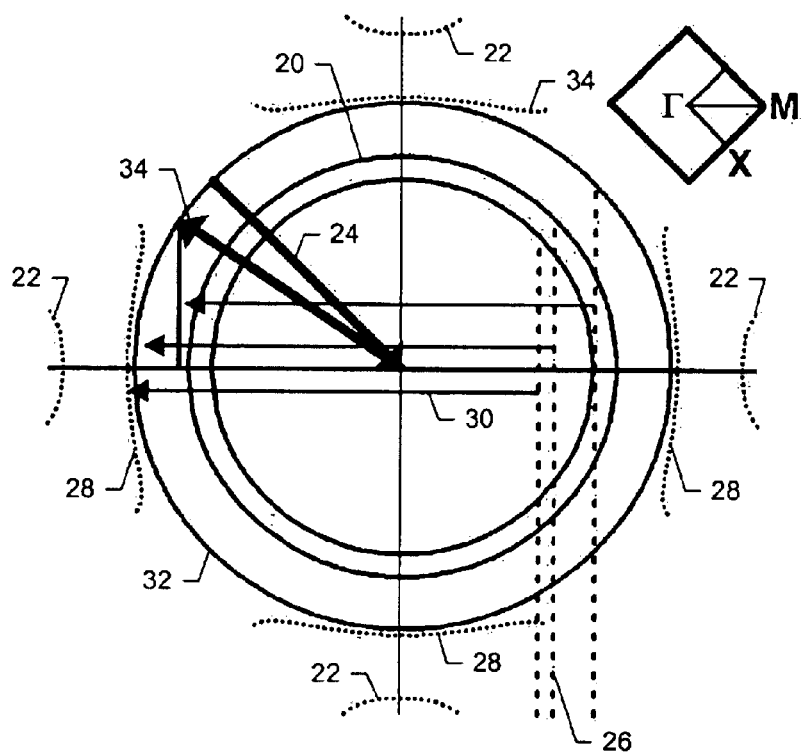
Figures 6A, 6B:
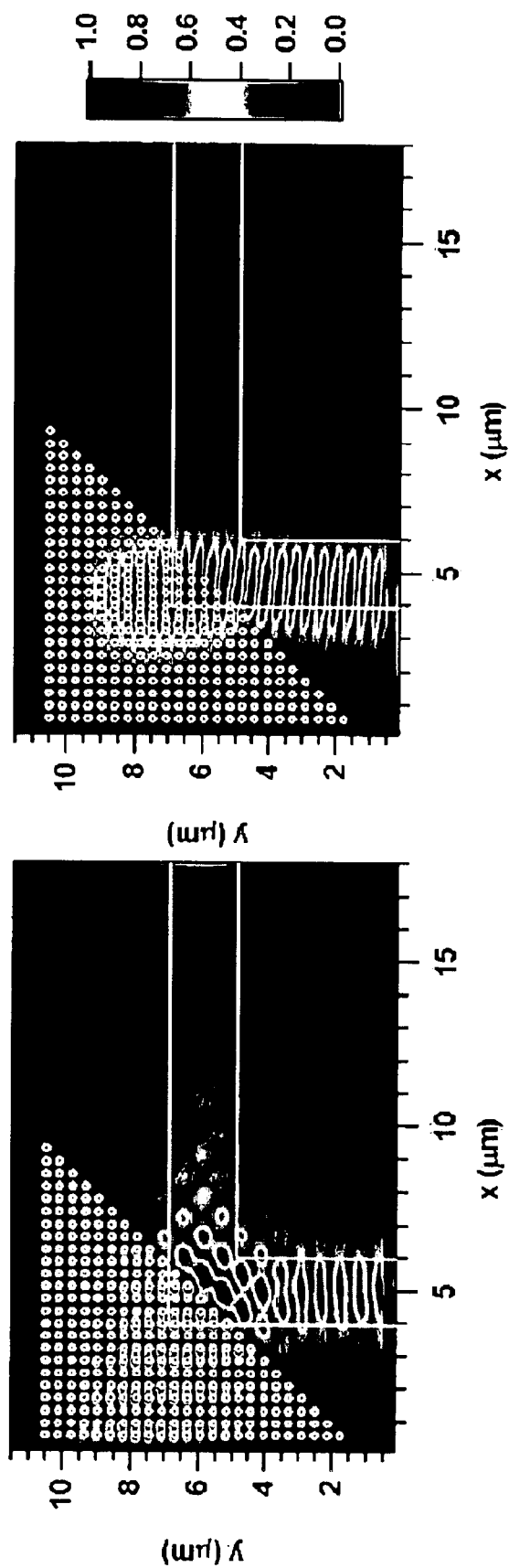
Figure 7:
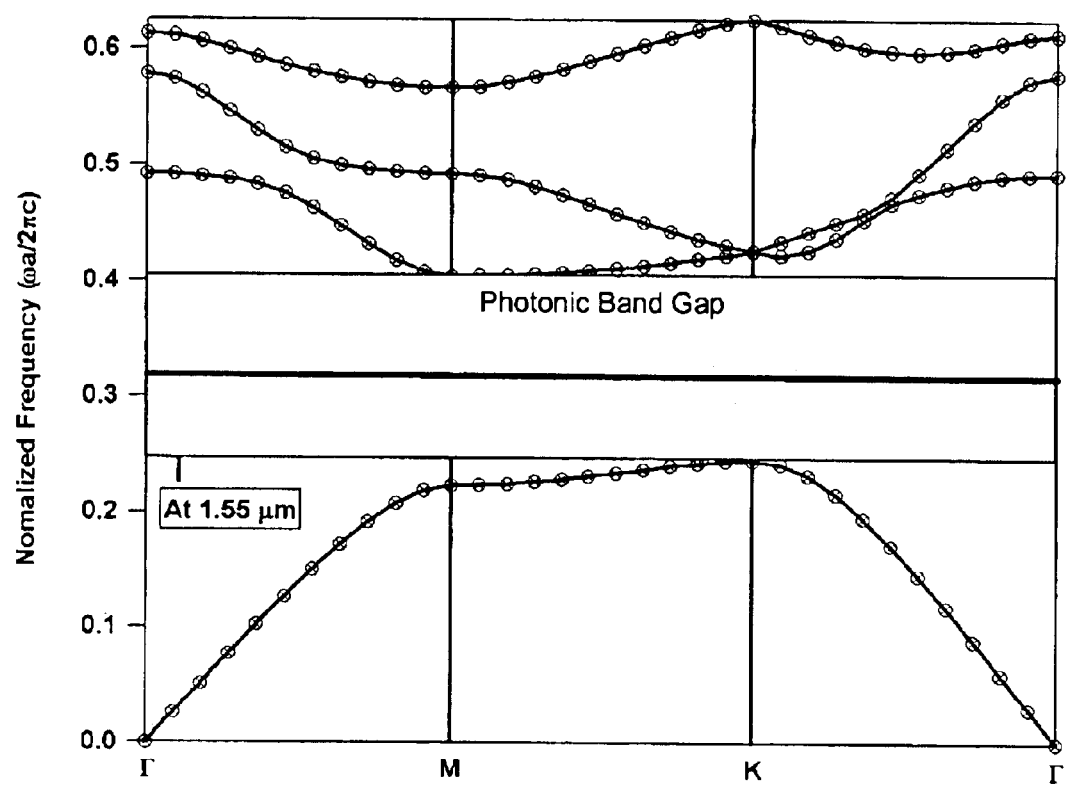
Figure 8:
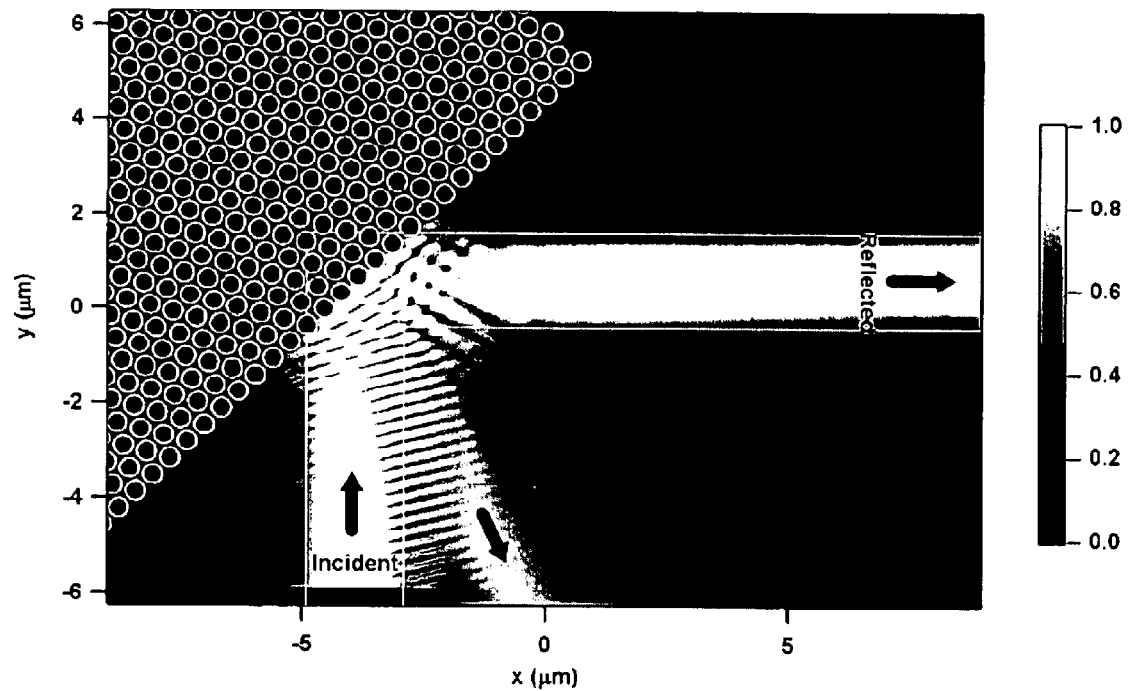
Figure 9:
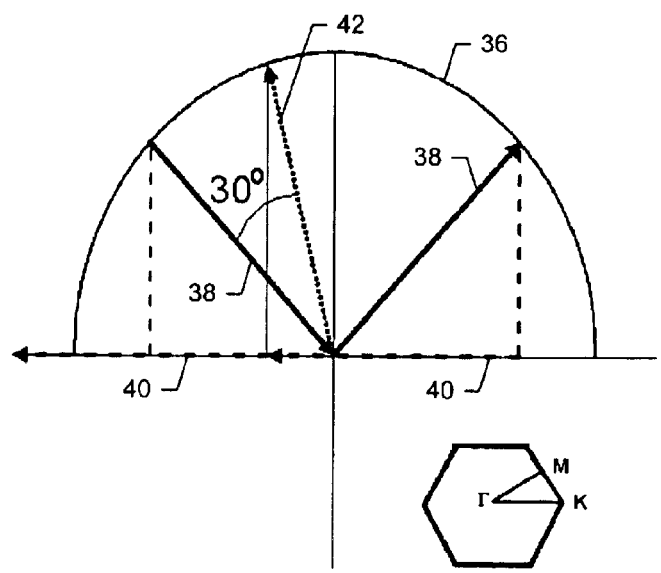
Figure 10:
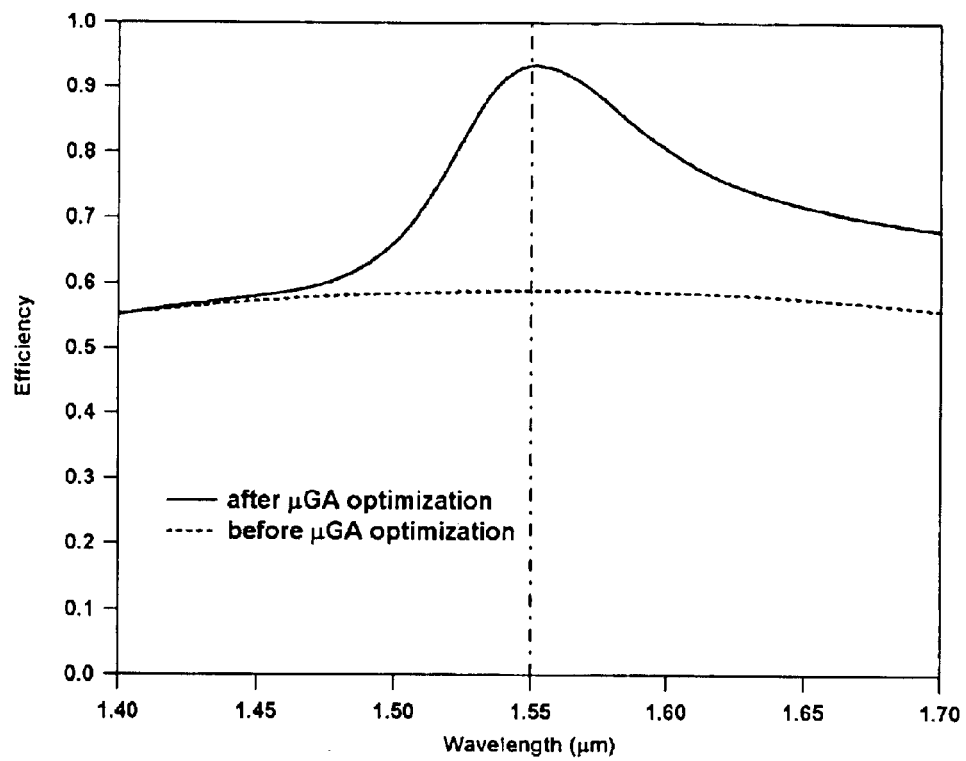
Figure 11:
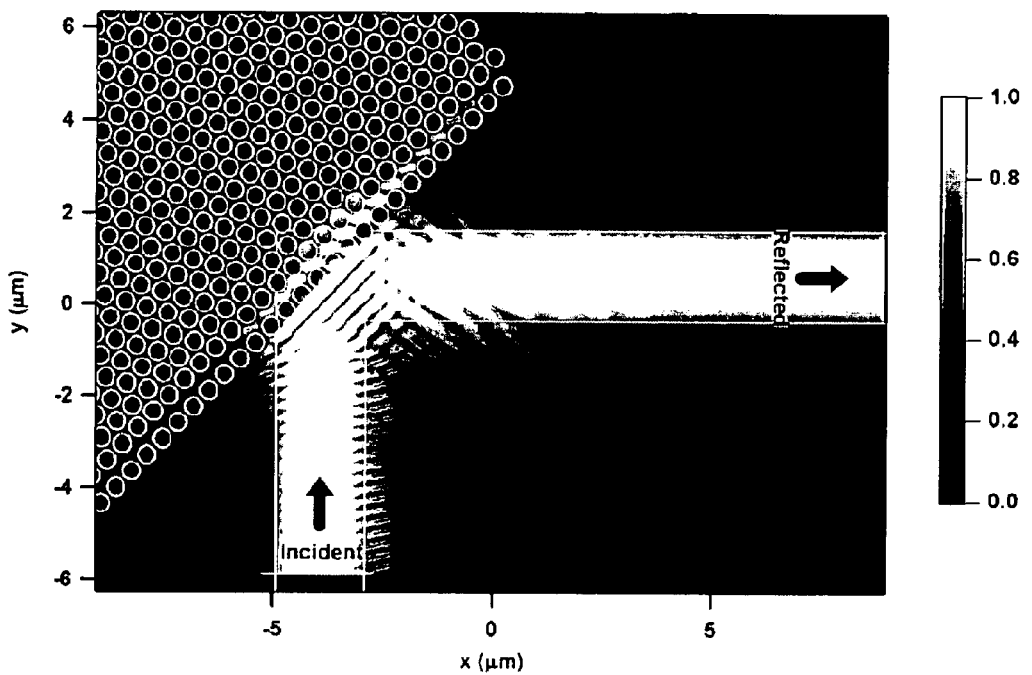
Figure 12:
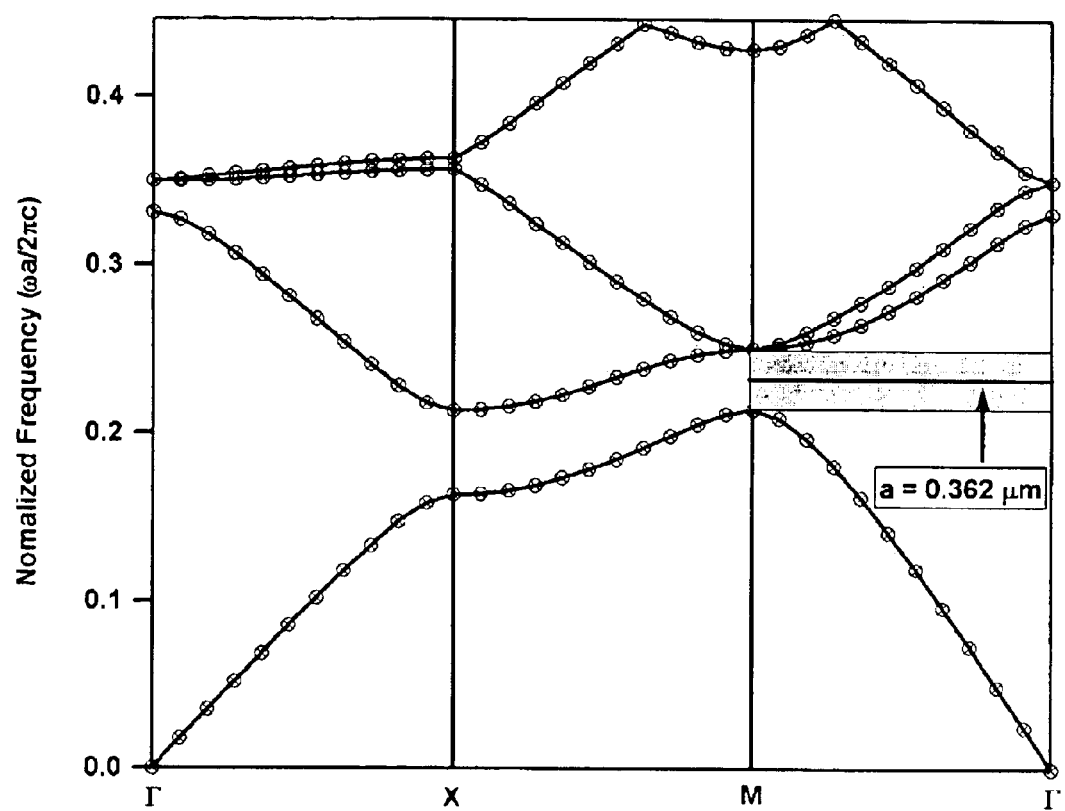
Figure 13:
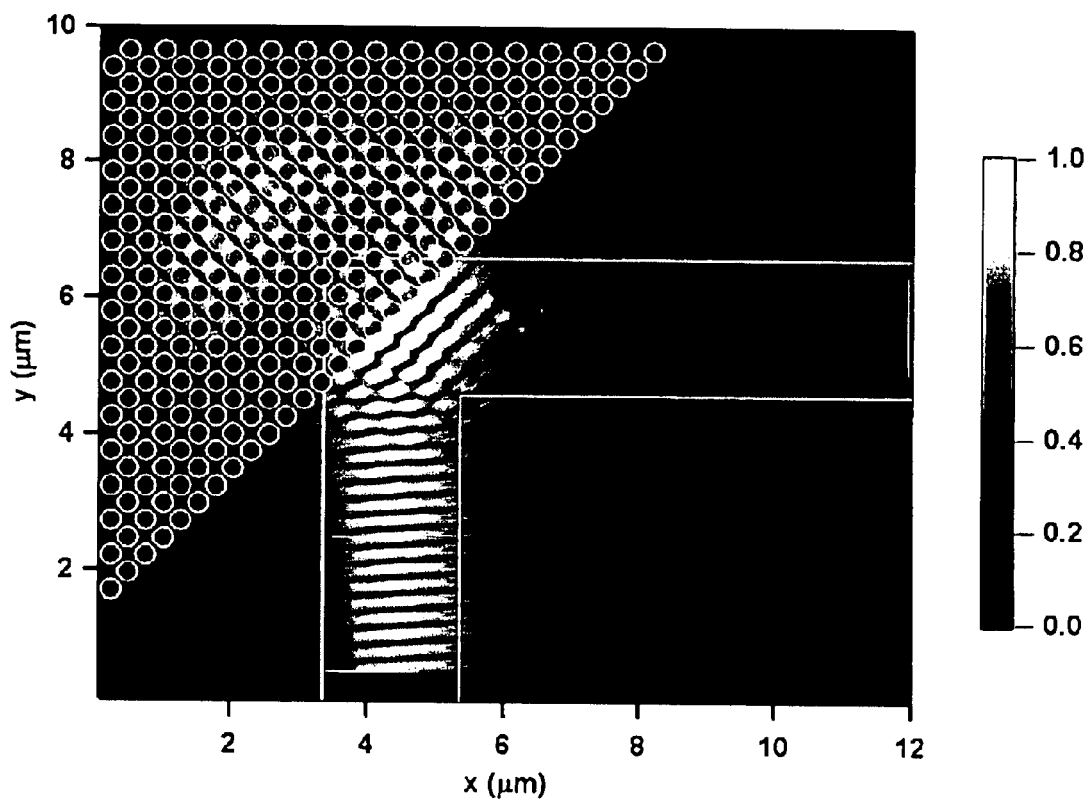
Figure 14:
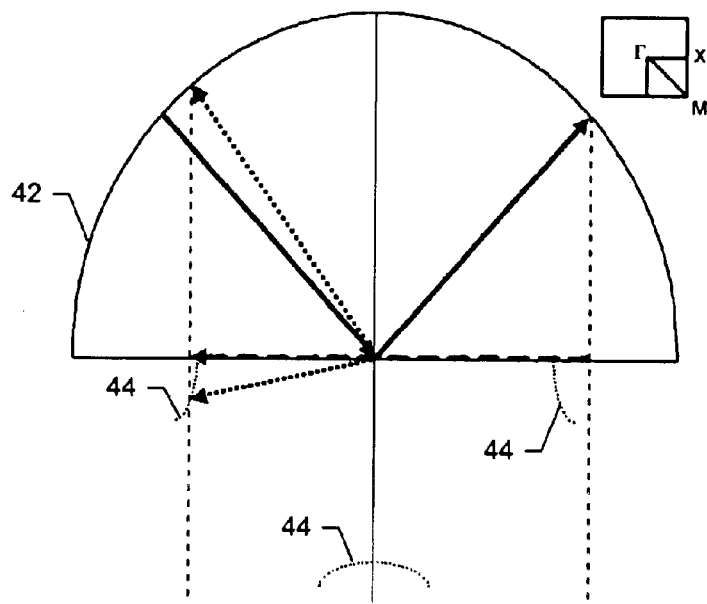
Figure 15:
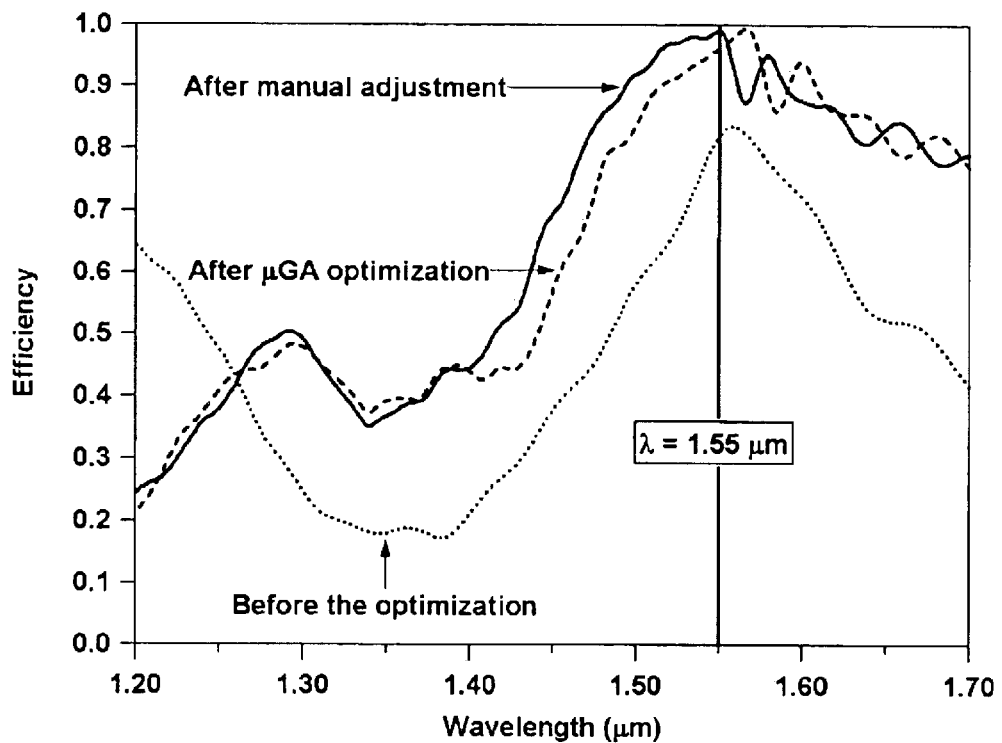
Figure 16:
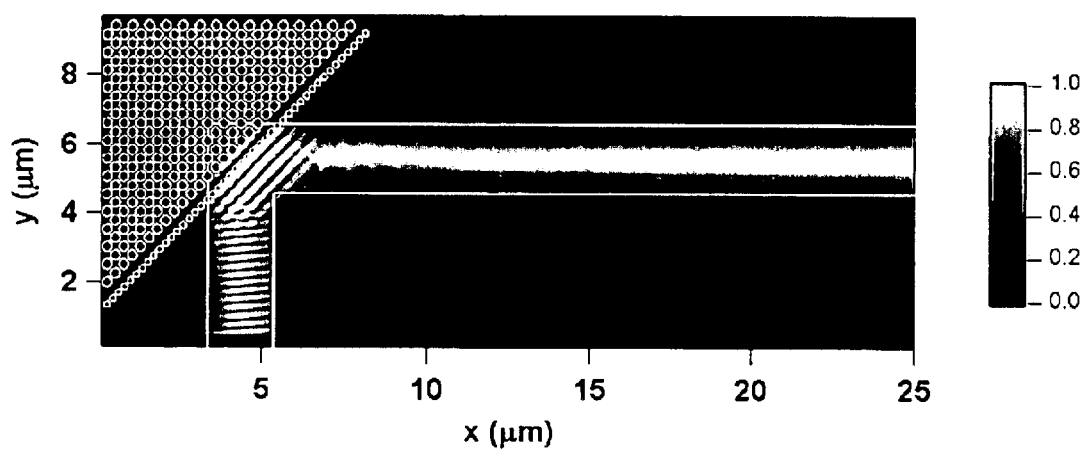
Figure 17A:
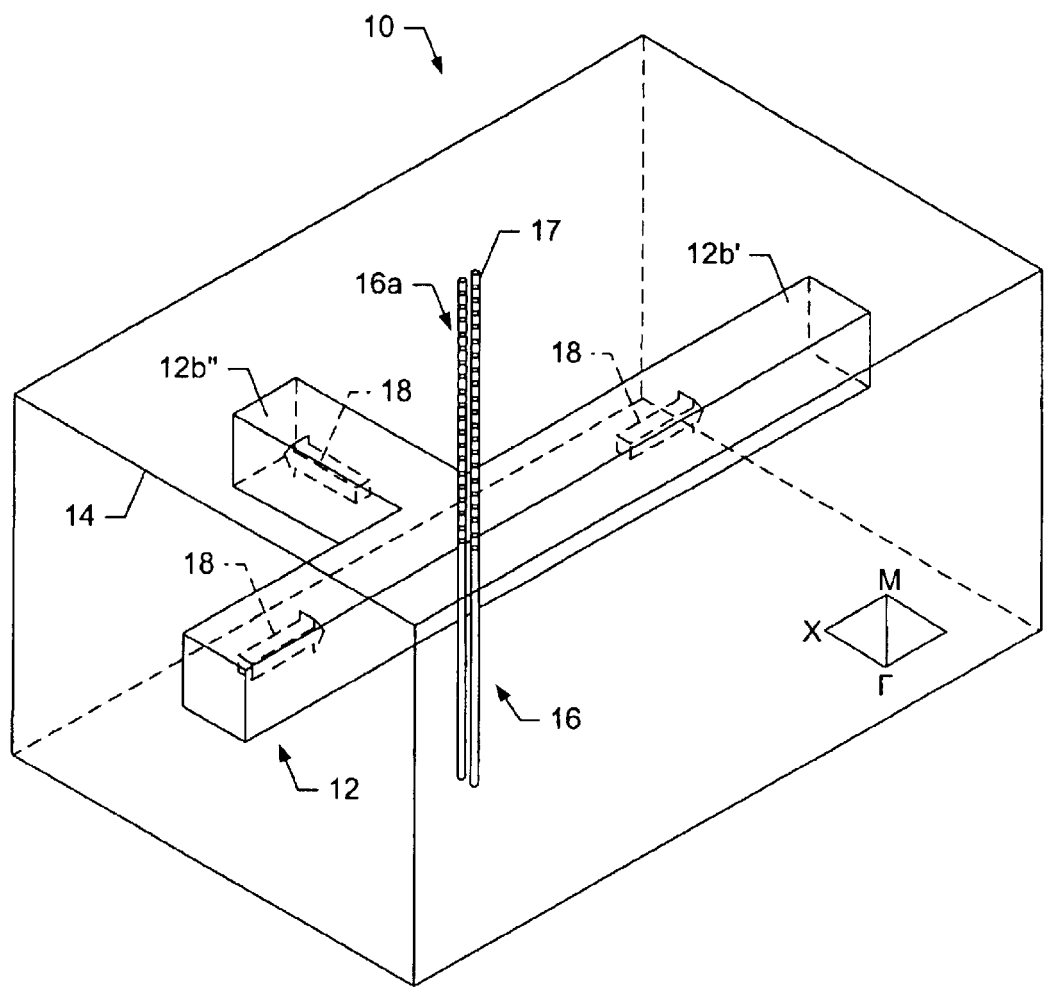
Figure 17B:
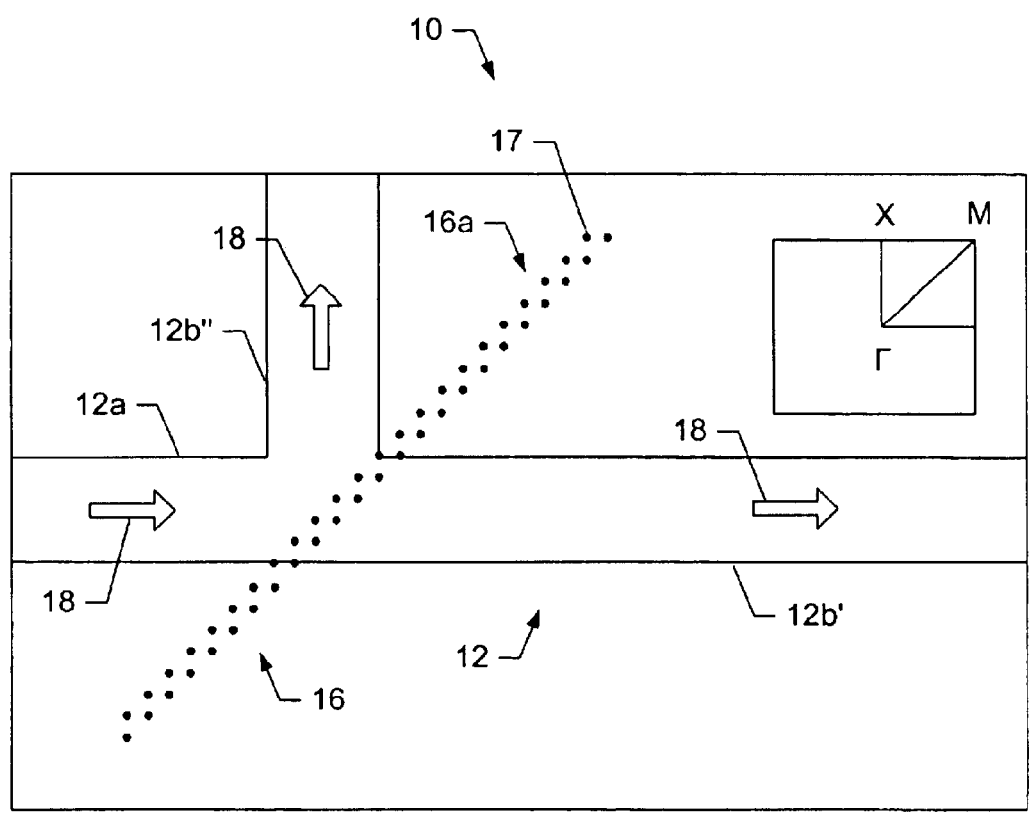
Figure 18:
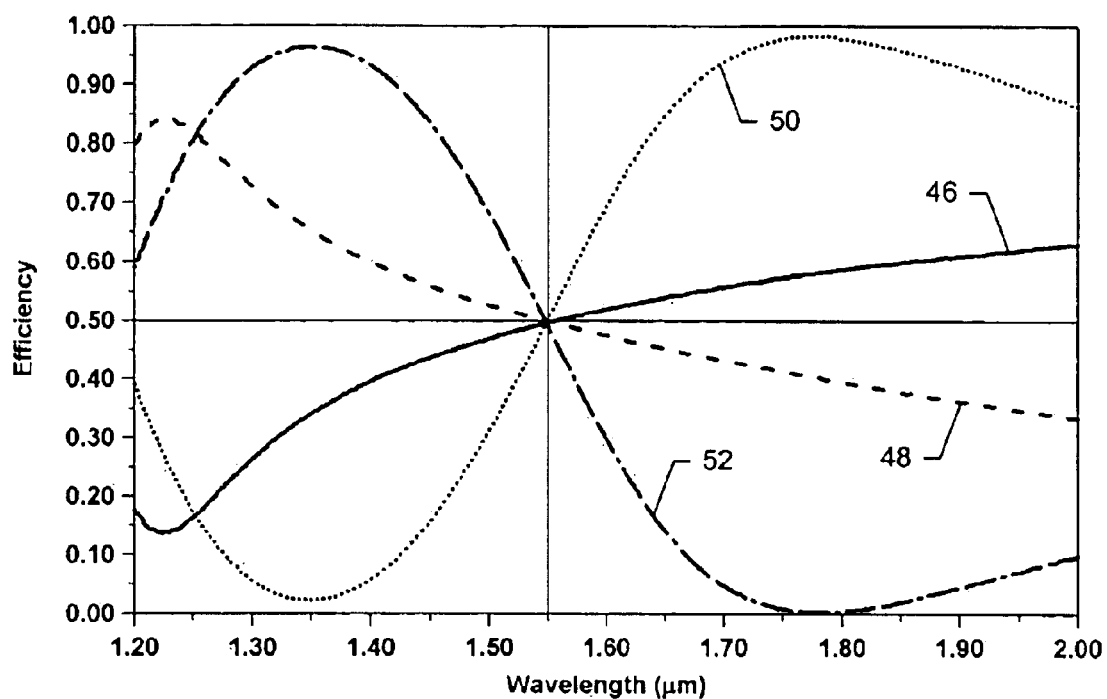
Figure 19:
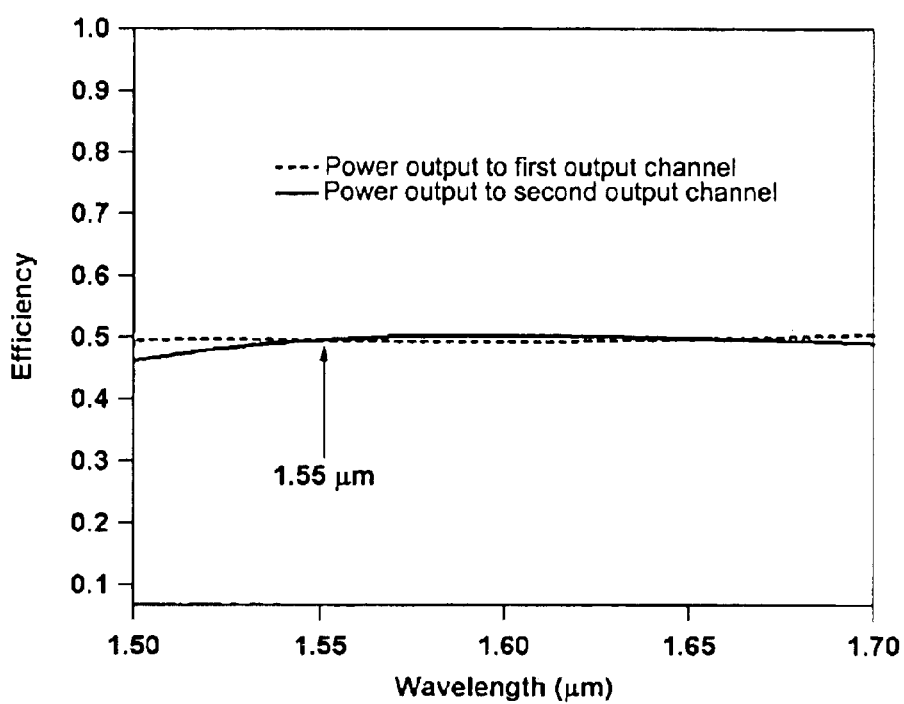
Figure 20:
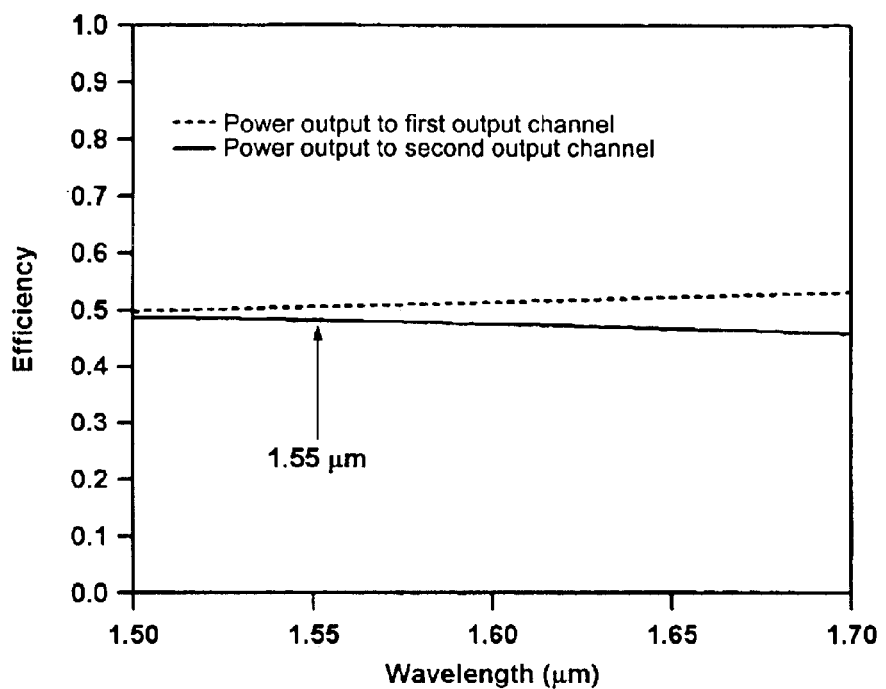
Figure 21:
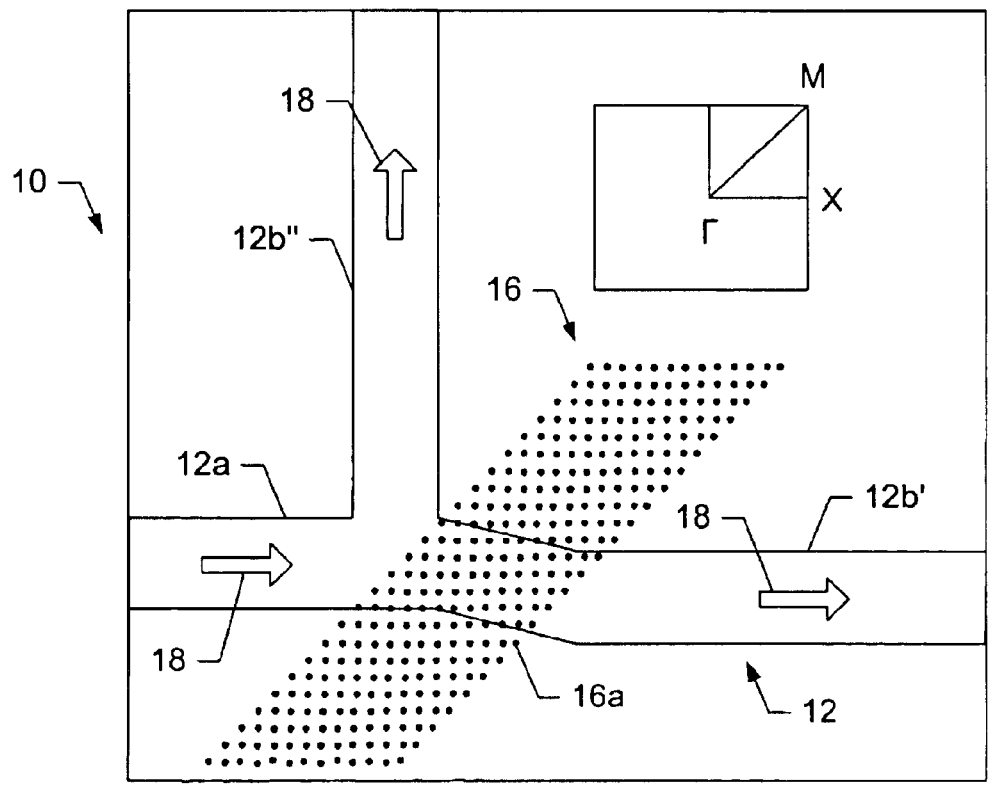
Figure 22:
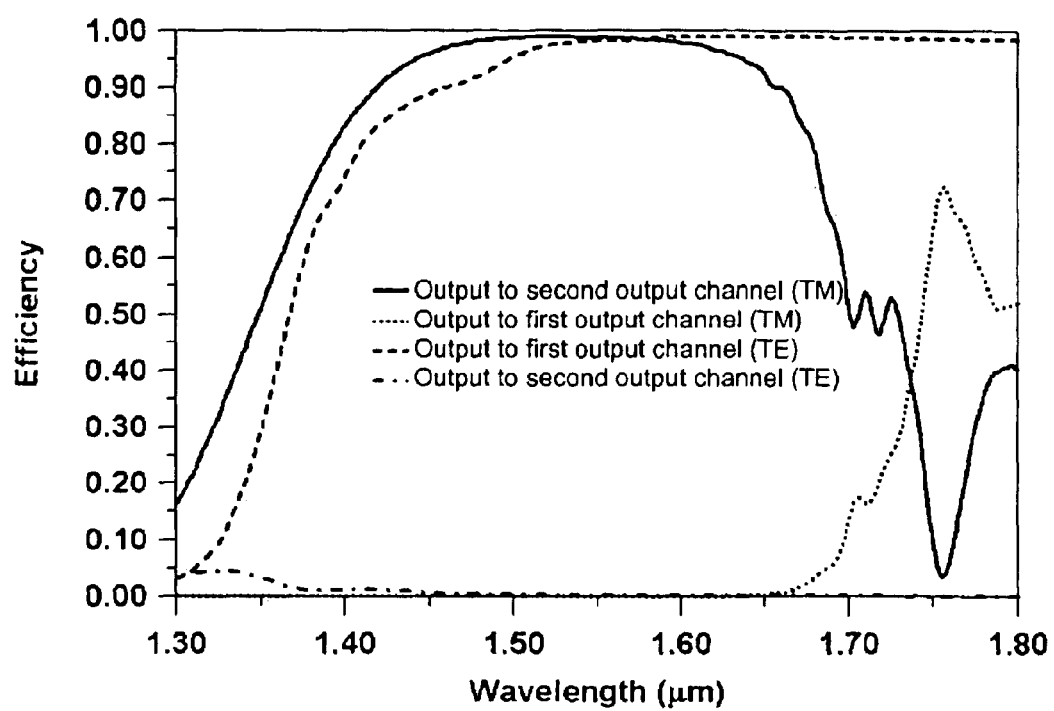
Figure 23A:
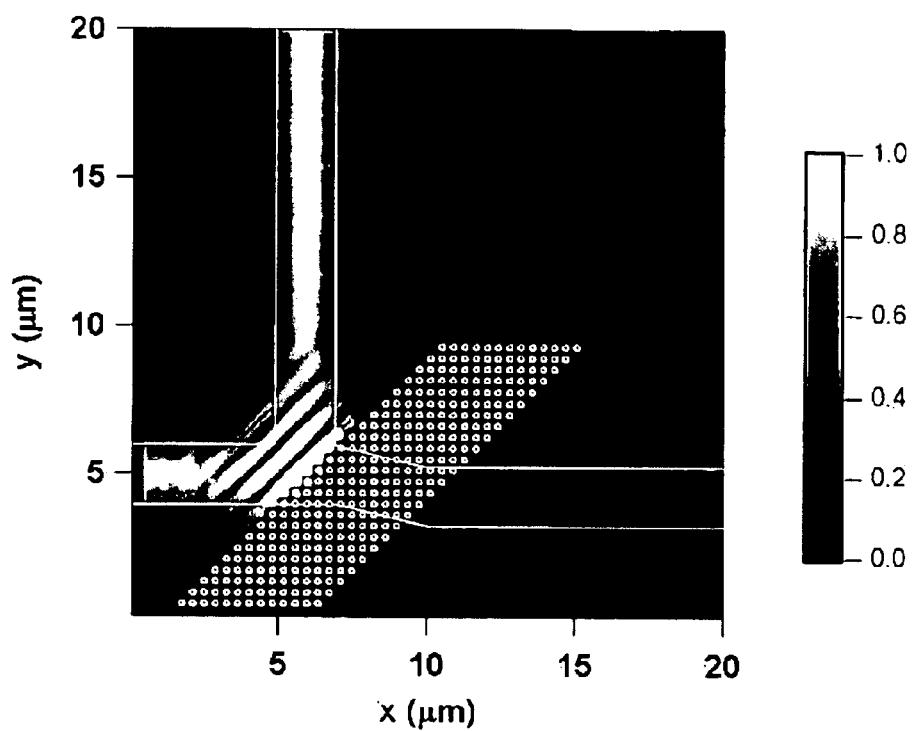
Figure 23B:
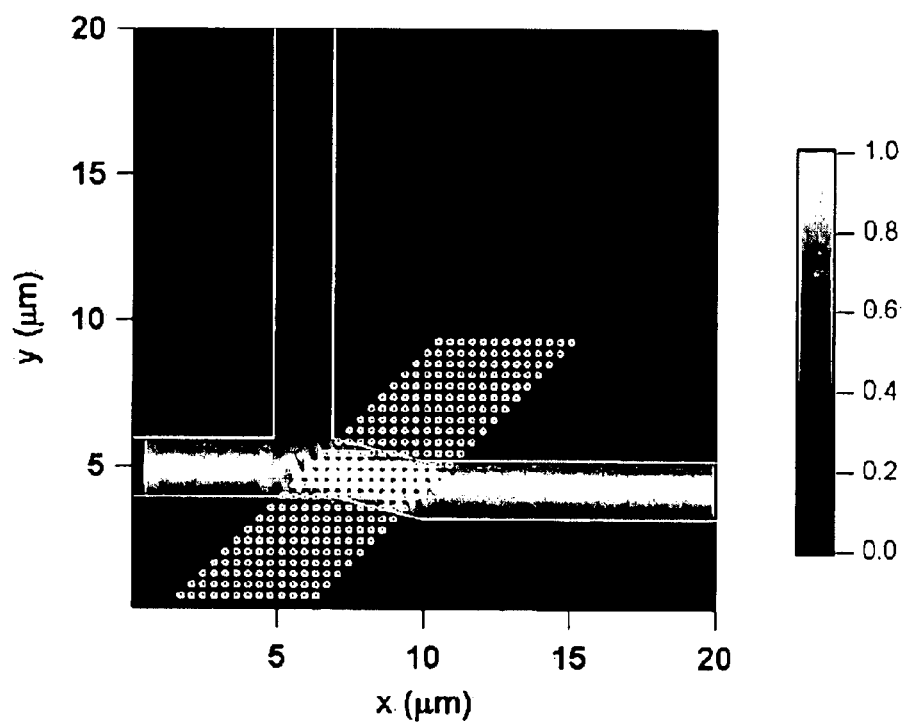
Figures 24A, 24B:
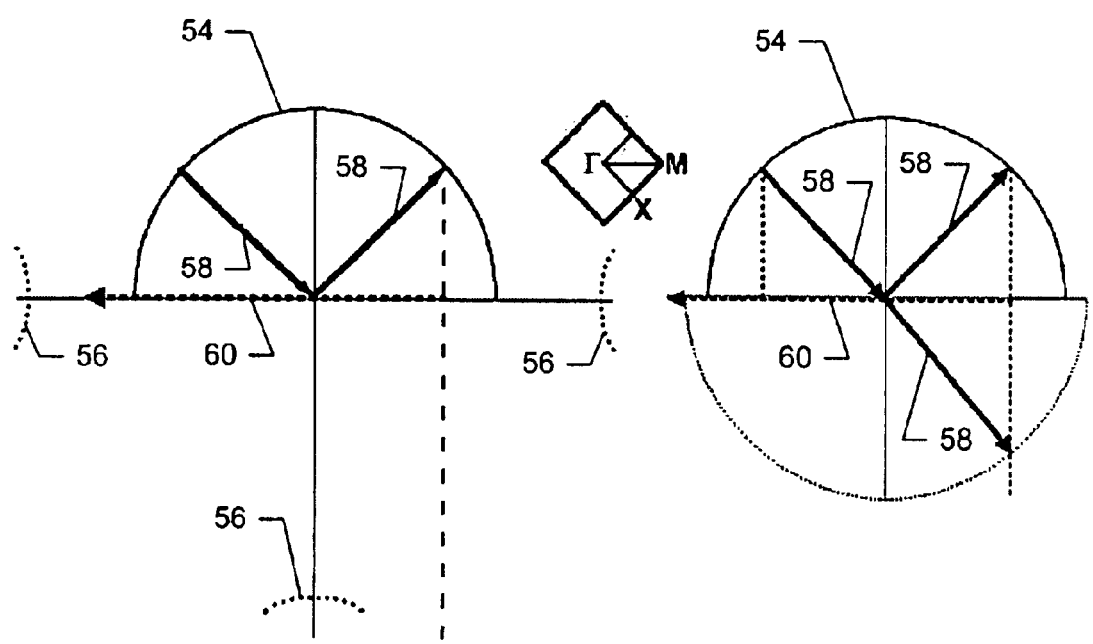
Figure 25:
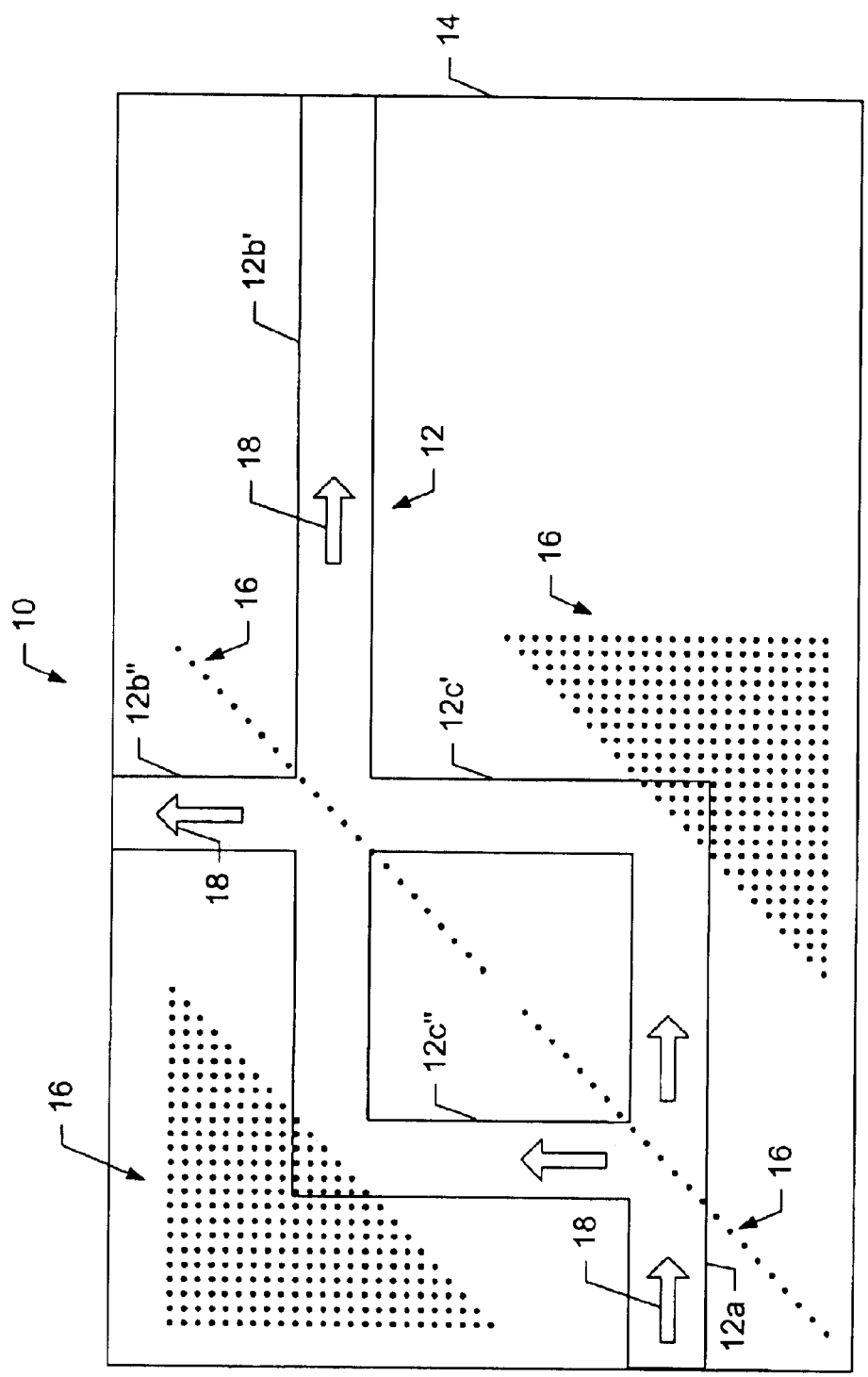
Figure 26:
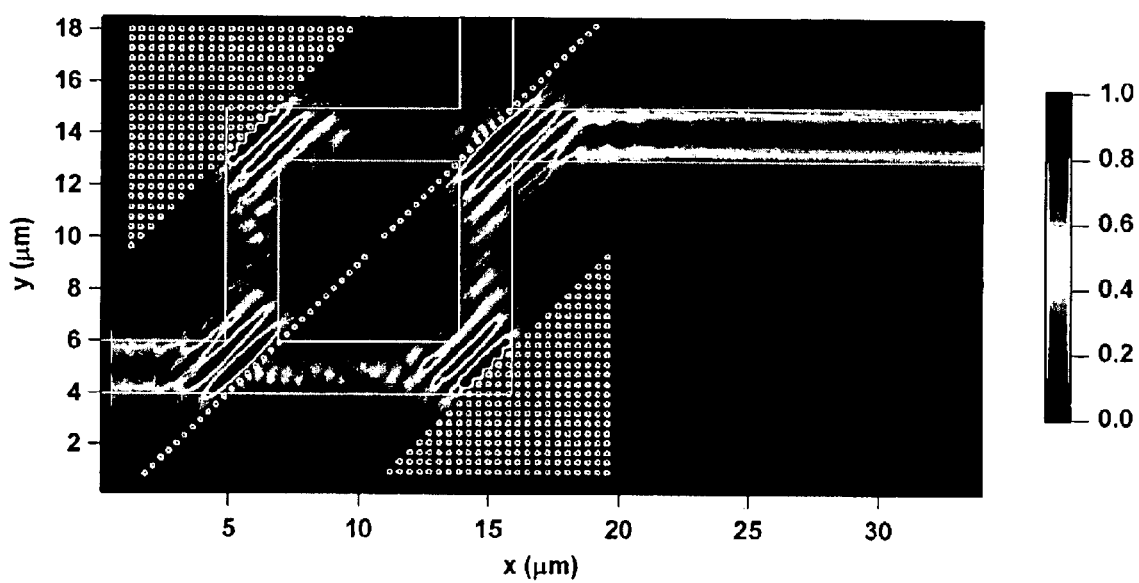
Figure 27:
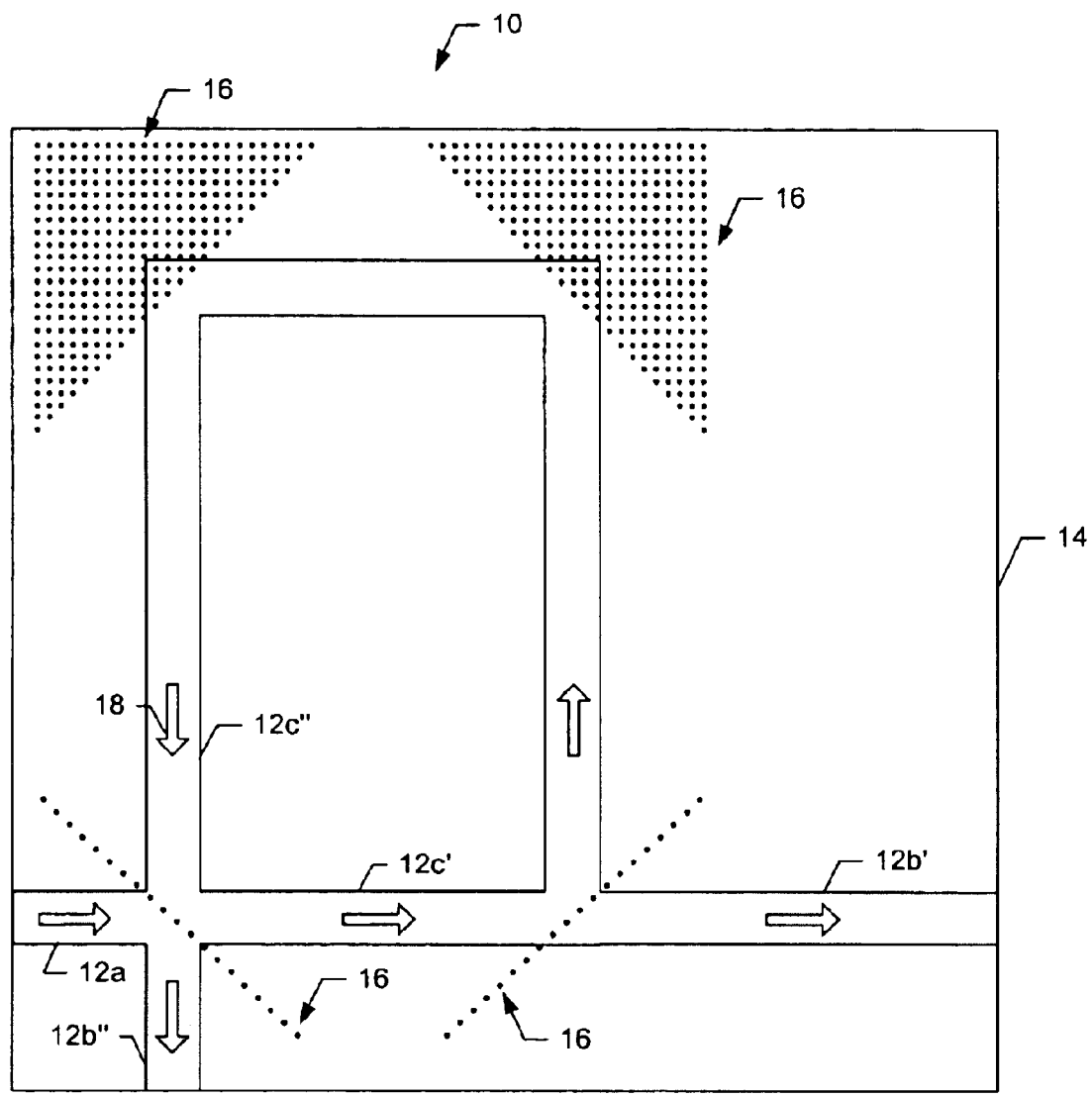
Figure 28A:
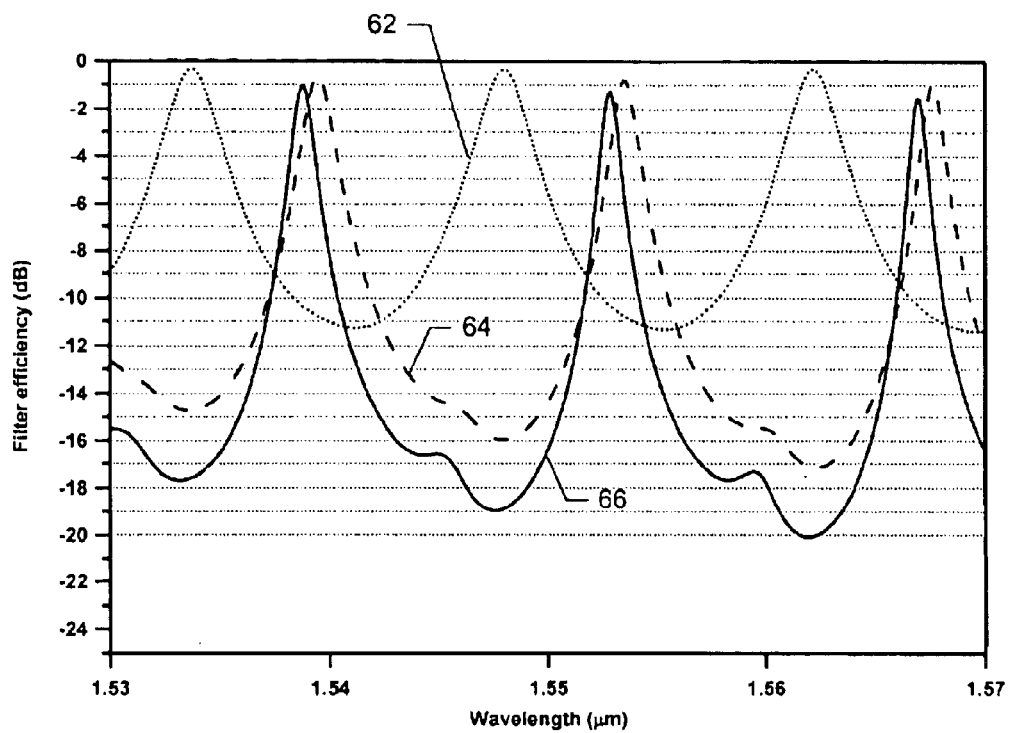
Figure 28B:
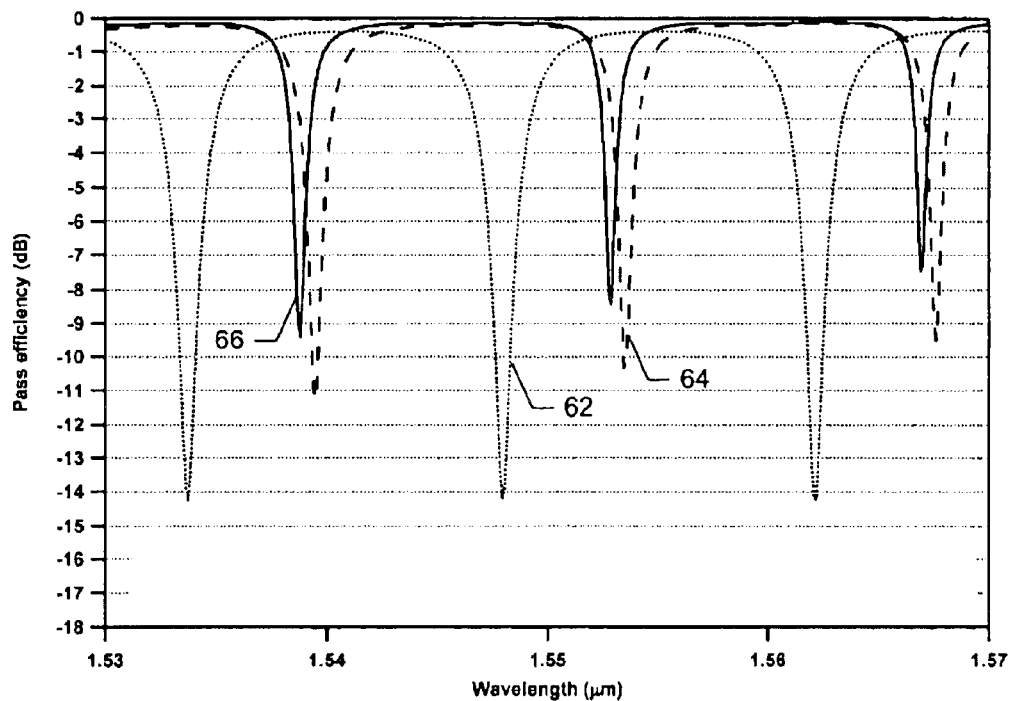

Having thus described the invention in general terms, reference will now be made to the accompanying drawings, which are not necessarily drawn to scale, and wherein:

FIGS. 1A and 1B are a perspective and top view of a waveguide assembly configured to operate as a waveguide bend in accordance with one embodiment of the present invention;

FIG. 2 illustrates a plot of the fractions of light that are transmitted, reflected and deflected as a function of wavelength for a waveguide assembly configured to operate as a waveguide bend in accordance with one embodiment of the present invention;

FIG. 3 illustrates the magnitude squared time averaged electric field for signals of light having a wavelength of 1.55 $\mu$m propagating through a waveguide assembly configured to operate as a waveguide bend in accordance with one embodiment of the present invention;

FIG. 4 illustrates a band diagram for a PhC region of a waveguide assembly configured to operate as a waveguide bend in accordance with one embodiment of the present invention;

FIG. 5 illustrates a wave vector diagram for a waveguide assembly configured to operate as a waveguide bend in accordance with one embodiment of the present invention;

FIGS. 6A and 6B illustrate the magnitude squared time averaged electric field for signals of light having a wavelength of 1.75 $\mu$m and 1.24 $\mu$m, respectively, propagating through a waveguide assembly configured to operate as a waveguide bend in accordance with one embodiment of the present invention;

FIGS. 7, 8 and 9 illustrate a dispersion relation, a magnitude squared time averaged electric field for signals of light having a wavelength of 1.55 $\mu$m, and a wave vector diagram, respectively, of a waveguide assembly configured to operate as a waveguide bend in accordance with one embodiment of the present invention, where the core has a relatively high refractive index, and the core and cladding have a relatively low refractive index contrast;

FIG. 10 illustrates the bend efficiency as a function of wavelength before and after micro-genetic algorithm ($\mu$GA) optimization of a waveguide assembly configured to operate as a waveguide bend in accordance with one embodiment of the present invention, where the core has a relatively high refractive index, and the core and cladding have a relatively low refractive index contrast;

FIG. 11 illustrates the geometry of a $\mu$GA optimized wavelength assembly and the magnitude squared time averaged magnetic field for light having a wavelength of 1.55 $\mu$m propagating through a waveguide assembly configured to operate as a waveguide bend in accordance with one embodiment of the present invention, where the core has a relatively high refractive index, and the core and cladding have a relatively low refractive index contrast;

FIGS. 12, 13 and 14 illustrate a dispersion relation, a magnitude squared time averaged electric field for signals of light having a wavelength of 1.55 $\mu$m, and a wave vector diagram, respectively, of a waveguide assembly configured to operate as a waveguide bend in accordance with one embodiment of the present invention, where the core has a relatively high refractive index, the core and cladding having a relatively low refractive index contrast, and the PhC region comprises a square array of air holes having a relatively low refractive index;

FIG. 15 illustrates the bend efficiency as a function of wavelength before and after $\mu$GA optimization of a waveguide assembly configured to operate as a waveguide bend in accordance with one embodiment of the present invention, where the core has a relatively high refractive index, the core and cladding having a relatively low refractive index contrast, and the PhC region comprises a square array of air holes having a relatively low refractive index;

FIG. 16 illustrates the geometry of a $\mu$GA optimized wavelength assembly and the magnitude squared time averaged magnetic field for light having a wavelength of 1.55 $\mu$m propagating through a waveguide assembly configured to operate as a waveguide bend in accordance with one embodiment of the present invention, where the core has a relatively high refractive index, the core and cladding having a relatively low refractive index contrast, and the PhC region comprises a square array of air holes having a relatively low refractive index;

FIGS. 17A and 17B are a perspective and top view of a waveguide assembly configured to operate as a beamsplitter in accordance with one embodiment of the present invention;

FIG. 18 illustrates a plot of the efficiency with which signals are split toward first and second output channels of a waveguide assembly configured to operate as a beamsplitter in accordance with one embodiment of the present invention;

FIG. 19 illustrates the spectral response for signals comprising transverse magnetic (TM) polarized light propagating through a waveguide assembly configured to operate as a beamsplitter in accordance with one embodiment of the present invention;

FIG. 20 illustrates the spectral response for signals comprising transverse electric (TE) polarized light propagating through a waveguide assembly configured to operate as a beamsplitter in accordance with one embodiment of the present invention;

FIG. 21 illustrates a top view of a waveguide assembly configured to operate as a polarizing beamsplitter in accordance with one embodiment of the present invention;

FIG. 22 illustrates the spectral response for signals comprising TM and TE polarized light propagating through a waveguide assembly configured to operate as a polarizing beamsplitter in accordance with one embodiment of the present invention;

FIGS. 23A and 23B illustrate the magnitude squared time averaged electric field and magnetic field for signals of TM and TE polarized light, respectively, having a wavelength of 1.55 $\mu$m propagating through a waveguide assembly configured to operate as a polarizing beamsplitter in accordance with one embodiment of the present invention;

FIGS. 24A and 24B illustrate wave vector diagrams for a waveguide assembly configured to operate as a polarizing beamsplitter for TM and TE polarized light, respectively, in accordance with one embodiment of the present invention;

FIG. 25 illustrates a top view of a waveguide assembly configured to operate as a Mach-Zender interferometer in accordance with one embodiment of the present invention;

FIG. 26 illustrates the magnitude squared time averaged electric field for signals of light having a wavelength of 1.55 $\mu$m propagating through a waveguide assembly configured to operate as a Mach-Zender interferometer in accordance with one embodiment of the present invention;

FIG. 27 illustrates a top view of a waveguide assembly configured to operate as a ring resonator in accordance with one embodiment of the present invention; and FIGS. 28A and 28B illustrate the drop and throughput efficiencies, respectively, as a function of wavelength at each output channel of a waveguide assembly configured to operate as a ring resonator in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with embodiments of the present invention, a waveguide assembly 10 includes a waveguide region and a photonic crystal (PhC) region 16. The waveguide region typically comprises a conventional waveguide such as a conventional waveguide region. In this regard, the waveguide region typically including a core 12 and a cladding 14 that at least partially surrounds the core to confine signals within the core. The core can be designed to support the propagation of signals in a single mode, where in such instances, the core is often referred to as a single mode signal core. The cladding, which can be formed of various materials, is typically formed of a material, such as polymer, that has a refractive index $n_{clad}$ that is lower than the refractive index of the core $n_{core}$. Although the waveguide region is shown and described herein as comprising a channel waveguide, it should be understood that the waveguide region can equally comprise any of a number of different types of conventional waveguides, without departing from the spirit and scope of the present invention. For example, the waveguide region can comprise a conventional slab or a rib waveguide.

As will be appreciated, in various instances it is desirable to design the waveguide assembly 10, including the dimensions and makeup (e.g., refractive indices) of the waveguide region (core 12 and cladding 14) and PhC region 16, as a two-dimensional (2D) structure. For example, consider a waveguide region that can have a of 2 $\mu$m×2 $\mu$m core so the waveguide region supports a single guided mode for wavelengths in the telecommunication band near 1.55 $\mu$m. A 2D design can be approximated from such a three-dimensional (3D) structure for rigorous numerical calculation. For example, for a 2D design, the waveguide region can include a 2 $\mu$m wide core and cladding having refractive indices $n_{core}$=1.500 and $n_{clad}$=1.465, respectively, for a refractive index contrast, $\Delta$=2.3% ($\Delta=(n_{core}-n_{clad})/n_{core}$). Once designed, the 2D structure (including, e.g., the dimensions and makeup) can be formulated back into a design for a 3D structure (including, e.g., the dimensions and makeup) that can thereafter be fabricated.

For example, techniques such as the effective index method can be utilized to convert the refractive indices of a 3D waveguide assembly 10 design into a 2D waveguide assembly design. For example, the waveguide region of a 3D waveguide assembly can include a 2 $\mu$m×2 $\mu$m core and cladding having refractive indices $n_{core}$=1.519 and $n_{clad}$=1.465, respectively, for a refractive index contrast $\Delta$=3.55%. Such a 3D waveguide region can be converted to a 2D waveguide region including a 2 $\mu$m wide core 12 and cladding 14 having refractive indices $n_{core}$=1.500 and $n_{clad}$=1.465, respectively, for a refractive index contrast $\Delta$=2.3%. Thereafter, the 2D waveguide assembly can be adapted back into a 3D waveguide assembly for subsequent fabrication. As shown, the cladding has the same refractive index for both the 2D and 3D waveguide assemblies. In this regard, the cladding refractive index can remain unchanged between the 2D and 3D waveguide assemblies because the cladding can be considered uniform along the lateral (e.g., vertical) direction. For more information on such an effective index method, see KOSHIBA MASANORI, OPTICAL WAVEGUIDE ANALYSIS (1992). As described herein, then, the exemplar dimensions and makeup of the various embodiments of the waveguide assembly are given for a 2D design of such a structure, with much of the analysis of such waveguide assemblies also given for a 2D design. It should be understood, however, that such 2D designs can be adapted into a 3D design in accordance with any of a number of different known manners.

According to embodiments of the present invention, the waveguide assembly 10 also includes a PhC region 16 that extends laterally through at least a part of the core 12 of the waveguide region. As is well known to those skilled in the art, photonic crystals are periodically structured electromagnetic media that generally possess photonic band gaps comprising ranges of frequency in which light cannot propagate through the photonic crystal structure. Thus, for conventional photonic crystal waveguides (formed by introducing defects in the crystals to generate localized electromagnetic states), it is typically desirable for the photonic crystals to have a wide band gap to confine signals within the conventional photonic waveguide.

As also well known to those skilled in the art, the size of the photonic band gap of photonic crystals has a direct relationship with the difference between the refractive indices of the photonic crystals and the material surrounding the photonic crystals. In other terms, the larger the difference between the refractive indices of the photonic crystals and the surrounding material, the wider the band gap of the PhC region. In this regard, conventional photonic crystal waveguides typically comprise photonic crystals and surrounding material that have a large difference between their respective refractive indices to thereby form a waveguide with a wide band gap.

Advantageously, and in contrast to conventional photonic crystal waveguides, in accordance with various embodiments of the present invention, the PhC region 16 of the waveguide assembly 10 need not have a wide band gap, as explained below. And as such, the PhC region and the core 12 (i.e., surrounding material) need not have a large difference between their respective refractive indices. The PhC region can therefore comprise any of a number of different periodic arrays of dielectric material that has a refractive index that differs from the refractive indices of the core and the cladding 14. In one embodiment explained below, for example, the PhC region comprises a lattice including a square or triangular array of silicon posts and has a refractive index $n_{PhC} \approx 3.481$, while the core has a refractive index $n_{core} = 1.500$. Alternatively, for example, the PhC region can comprise a lattice including a square or triangular array of air holes and have a refractive index $n_{PhC} = 1.000$, while the core has a refractive index $n_{core} \approx 3.200$ or $n_{core} \approx 1.500$.

As shown in the configurations of the waveguide assembly 10 disclosed below, the PhC region 16 of one advantageous embodiment extends beyond the core 12 into the cladding 14 on each side of the core, such as in a square or triangular array of posts or the like. As explained below, signals propagating through an input channel become incident at an angle of incidence on a surface of the PhC region. By extending the PhC region into the cladding, the PhC region is capable of covering the incident light mode width, which is typically wider than the core width, particularly when the core and cladding have a relatively small difference between their respective refractive indices and by covering the incident light mode width, the waveguide assembly is capable of operating with reduced loss of the mode tail in the cladding by the scattering with the PhC region when compared to conventional PhC waveguides.

In accordance with embodiments of the present invention, the waveguide assembly 10 can have any of a number of different configurations to perform any of a number of different functions. More particularly, the waveguide region (including core 12 and cladding 14) and PhC region 16 can be arranged in any of a number of different manners such that the waveguide assembly can perform any of a number of different functions. Generally, however, the waveguide assembly includes a waveguide region and at least one PhC region. The waveguide region includes a longitudinally extending core that includes an input channel and at least one output channel. The waveguide region also includes a cladding at least partially surrounding the core for confining signals within the core. The PhC region(s), in turn, extend laterally through at least a portion of the core. As such, the PhC regions can function to at least partially direct signals propagating through the core.

More particularly, as explained below, the waveguide assembly 10 can be configured to operate as a waveguide bend, a beamsplitter, a polarizing beamsplitter, a Mach-Zender interferometer and a ring resonator. It should be understood, however, that such configurations are but a number of exemplar configurations of the waveguide assembly. In this regard, the waveguide assembly can be configured in any of a number of different manners other than those shown and described herein to perform the same or different functions.

A. Waveguide Bend

As shown in FIGS. 1A and 1B, in accordance with one embodiment of the present invention, the waveguide assembly 10 can be configured to operate as a waveguide bend. In this regard, the core 12 of the waveguide region of this embodiment can include an input channel 12a and an output channel 12b that intersect at an angle forming the bend. As shown, for example, the input and output channels can intersect at a ninety-degree angle such that the waveguide assembly is configured to operate as a ninety-degree bend. To direct signals propagating through bend from the input channel 12a to the output channel 12b, then, the waveguide assembly of this embodiment includes a PhC region 16 extending laterally through at least a portion of the core at the intersection of the input and output channels.

More particularly, to direct signals from the input channel 12a to the output channel 12b, the PhC region 16 extends laterally through a portion of the core at the intersection such that, consistent with the law of reflection, at least a portion of the signals propagating from the input channel deflect off of the PhC region at an angle equal to half of the bend angle. At least a portion of signals propagating through the input channel become incident at an angle of incidence on a surface of the PhC region. In this regard, the incident signals can deflect to the output channel at an angle of deflection equal to the angle of incidence, where both angles are measured from a line normal to an incidence surface 16a of the PhC region. Thus, for a ninety-degree bend angle, the PhC region extends laterally through a portion of the core at the intersection of the input and output channels such that signals from the input channel are incident at a forty-five-degree angle of incidence on a surface of the PhC region extending through a portion of the core.

1. Low Refractive Index Core/High Refractive Index PhC Region

In the embodiment of the waveguide assembly 10 shown in FIG. 1, the waveguide region can comprise, as indicated above for example, a core 12 and cladding 14 having refractive indices $n_{core} = 1.500$ and $n_{clad} = 1.465$, respectively, for a refractive index contrast $\Delta = 2.3\%$. The PhC region 16 shown in FIG. 1 can comprise, for example, a lattice including a square or triangular array of posts 17 (e.g., silicon posts), holes or the like. The lattice can have, for example, a lattice constant or periodicity, $a = 380$ nm. Also, for example, the posts can have a radius, $r = 86.8$ nm, and a refractive index $n_{PhC} = 3.481$. Further, for example, the fundamental waveguide mode can be sourced along an 8 μm×8 μm plane (8 μm wide line in the 2D case) centered on the input channel 12a of the core directed toward the PhC region 16. And as indicated above, the PhC region can extend beyond the core 12 into the cladding 14 on each side of the core. Thus, for example, the PhC region can extend beyond the core (e.g., 2 μm core) and into the cladding such that most, if not all, of the 8 μm fundamental waveguide mode can become incident on the incidence surface 16a of the PhC region.

Signals 18 propagating through the input channel 12a can comprise, for example, transverse magnetic (TM) polarized light (i.e., electric field orientation parallel to the posts or holes comprising the PhC region). As described herein, the waveguide region (including core 12 and cladding 14) and PhC region 16 comprise a waveguide region and PhC region having the exemplar characteristics as explained above, unless otherwise noted. It should be understood, however, that the characteristics of the waveguide region and PhC region can vary from those given above, without departing from the spirit and scope of the present invention.

Using a technique, such as a 2D finite difference time domain (FDTD) technique with Berenger perfectly matched layer boundary conditions, the optical properties of a waveguide assembly 10 configured as shown in FIG. 1 can be numerically evaluated. In this regard, a transmission detector and reflection detector can be situated to monitor a field along a given (e.g., 8 μm wide) detector line for signals that propagate from the input channel 12a through the PhC region 16, and for signals that reflect off the PhC region back toward the input channel, respectively. In addition, a bending detector can be situated to monitor a field along a given (e.g., 8 μm wide) detector line for signals that deflect off the PhC region toward the output channel 12b of the core.

In evaluating the optical properties of an optical waveguide 10 configured as a ninety-degree waveguide bend, the fractions of signals 18 incident on the PhC region 16 that are transmitted, reflected and deflected can be determined as a function of wavelength. As will be appreciated, the fraction of incident signals that is deflected as a function of wavelength is often referred to as the bending efficiency. FIG. 2 illustrates a plot of the fractions of light that are transmitted, reflected and deflected as a function of wavelength. As shown, an insignificant amount of light is transmitted through the PhC region for wavelengths between 1.23 μm and 1.68 μm. Instead, most of the signals are either reflected back in the direction of the input channel 12a of the core 12, or deflected toward the output channel 12b. It should be noted that over the wavelength range between 1.23 μm and 1.68 μm, the bending efficiency is greater than 95% for a broad range of wavelengths (~1.43 to 1.64 μm, $\Delta\lambda/\lambda$=13.5%).

Consider, for example, signals having a wavelength of 1.55 μm propagating through a waveguide assembly 10 configured as a waveguide bend. FIG. 3 illustrates the magnitude squared time averaged electric field for signals 18 of light having a wavelength of 1.55 μm. In such an instance, the bending efficiency can be shown to equal approximately 98.7%, while only 0.14% of the incident light is reflected back in the direction of the input channel 12a. In contrast, the bend radius for a conventional ninety-degree curved waveguide of the same bending efficiency is 2.5 mm. As can be seen, then, the PhC region 16 of the waveguide shown in FIG. 1, can function as a high efficiency, mode-matched mirror, thereby achieving a dramatic reduction in the area required to realize a bend in the waveguide region.

Reference is now made to FIG. 4, which illustrates a band diagram of the PhC region 16 of the waveguide assembly 10 of FIG. 1. As can be seen in FIG. 4, a wavelength of 1.55 μm (normalized frequency of 0.243) does not lie in the photonic band gap of the PhC region, but rather is just below the photonic band gap. It is worth noting, however, that at a wavelength of 1.55 μm, a significant portion of the signal does not couple into a propagating mode of the PhC region and instead is deflected with great efficiency toward the output channel 12b of the core. Thus, as indicated above and explained below, in contrast to conventional photonic crystal waveguides, the PhC region need not have a wide band gap to realize a high bending efficiency.

The feature illustrated in FIG. 4 can be further understood by an examination of the wave vector (i.e., equifrequency) diagram shown in FIG. 5. As shown in FIG. 5, the horizontal axis represents the Γ-M direction of the first Brillouin zone of the PhC region 16 (see FIG. 1), which coincides with the direction of the incidence surface 16a of the PhC region that is situated at forty-five degrees to the input and output channels 12a, 12b of the core 12 of the waveguide region. In this regard, Γ, M and X represent points in the first Brillouin zone of the PhC region, as will be appreciated by those skilled in the art. For light having a wavelength λ=1.55 μm, then, circle 20 indicates the allowed wave vectors in the core and cladding 14 of the waveguide region, where the waveguide mode effective refractive index of the waveguide region can be treated as homogeneous for simplicity in constructing the wave vector diagram. Also, dotted curves 22 denote the wave vectors for allowable propagation modes in the PhC region. It is noted that for light incident from the input channel at an angle of forty-five degrees to the PhC incidence surface (arrow 24), there are no allowed states in the PhC region that the signal can couple into the PhC region (i.e., dashed vertical line 26 does not intersect the allowed PhC wave vector curves 22). Therefore, it is not necessary that the PhC region be configured such that the wavelengths of interest fall strictly within the photonic band gap of the PhC region.

As an alternative, consider signals having a wavelength λ=1.75 μm. As shown in FIG. 4, such a wavelength is considerably below the low frequency edge of the photonic band gap of the PhC region 16 of the waveguide assembly 10 shown in FIG. 1. As shown in FIG. 6A, for a signal having a wavelength λ=1.75 μm, a significant portion of the signal is coupled into the PhC region 16 of the waveguide assembly 10. In this regard, as shown by wave vector curves 28 in FIG. 5, incident signals having a wavelength λ=1.75 μm can be directly coupled into an allowed PhC propagating mode. Moreover, the first diffraction order (with a wave vector component in the Γ-M direction given by the end of arrow 30) can couple into a PhC propagating mode as well.

It is also useful to understand why such a large fraction of signals in the 1.23–1.32 μm wavelength range of the photonic band gap of the PhC region 14 is reflected back toward the input channel 12a of the core 12 rather than deflected toward the output channel 12b. From FIG. 2, it can be seen that a peak reflection efficiency occurs for signals having a wavelength λ≈1.24 μm. As seen in FIG. 4, a wavelength λ≈1.24 μm is just below the high frequency edge of the band gap of the PhC region. Further, as shown in FIG. 6B, for a wavelength λ≈1.24 μm, the reflected light is not directed exactly back through the input channel of the core. Circle 32 in FIG. 5 illustrates the corresponding wave vector diagram, in which there are no allowed propagating modes in the PhC region. However, the first diffraction order (with wave vector shown by heavy arrow 34) is not evanescent, but propagates at an angle (e.g., approximately nine-degrees) relative to the input channel of the core. This first diffraction order contains most of the signal power redirected by the PhC region. Thus, the existence of allowed diffraction orders in the nearly homogeneous waveguide region due to diffraction from a periodic PhC interface can be a significant design consideration when integrating limited PhC regions with waveguide regions. As described below, however, the boundary layer of the PhC region 16 (i.e. the first layer of air holes) at the incidence surface 16a of the PhC region can be modified to thereby manipulate the diffraction effect caused by the periodicity of the boundary.

2. High Refractive Index Core/Low Refractive Index, Triangular PhC Region and TE Polarized Signals As explained above, the waveguide region of the waveguide assembly 10 can have core 12 with a relatively low refractive index (e.g., $n_{core}$=1.500), with the core and cladding 14 (e.g., $n_{clad}$=1.465) having a relatively low refractive index contrast (e.g., $\Delta$=2.3%). As also explained above, the PhC region 16 can comprise a square or triangular array of posts 17 and have a relatively high refractive index (e.g., $n_{PhC}$=3.481). As explained below, however, the core can alternatively have a relatively high refractive index, with the core and cladding again having a relatively low refractive index contrast. Also, the PhC region can alternatively comprise, for example, a square or triangular array of air holes having a relatively low refractive index.

Consider a waveguide assembly 10 configured as a waveguide bend, where the waveguide region includes a core 12 having a refractive index $n_{core}$=3.250 and a cladding 14 having a refractive index $n_{clad}$=3.200, for a refractive index contrast $\Delta$=1.54%. Also, consider the PhC region 16 comprising, for example, a square or triangular array of air holes having a refractive index $n_{PhC}$=1.000. Reference is now made to FIG. 7, which illustrates the dispersion relation of a triangular lattice PhC region, where the waveguide region (core and cladding) is assumed to be quasi-homogeneous with an effective refractive index $n_{eff}$=3.239 and the signals 18 comprise transverse electric (TE) polarized light (i.e., electric field orientation perpendicular to the posts or holes comprising the PhC region). As shown in FIG. 7, such a PhC region has a photonic band gap in the range of normalized frequencies between 0.245($a/\lambda_0$) and 0.404 ($a/\lambda_0$) for r/a=0.4. In the preceding, r represents the radius of the air holes of the PhC region, a represents the lattice constant or periodicity of the PhC region, and $\lambda_0$ represents the wavelength in a vacuum.

Based on a waveguide assembly 10 having such an arrangement, consider a normalized frequency of 0.319($a/\lambda_0$), which is close to the center of the photonic band gap shown in FIG. 7. For $\lambda_0$=1.55 $\mu$m, the triangular lattice PhC region has a radius r=0.198 $\mu$m and a periodicity a=0.495 $\mu$m. The magnitude squared time averaged magnetic field for such a waveguide assembly at $\lambda$=1.55 $\mu$m, which can be determined from the 2D FDTD technique with Berenger perfectly matched layer boundary conditions, is shown in FIG. 8. From FIG. 8, it can be seen that such a waveguide configuration does not produce a high bend efficiency because a significant fraction of incident signals is diffracted by the PhC region 16, and propagates in an unwanted direction between the input and output channels 12a, 12b.

Referring now to a wave vector diagram of such a waveguide assembly 10, shown in FIG. 9, non-PhC and PhC regions are divided by the horizontal axis which corresponds to the PhC boundary along the $\Gamma$-K direction of the triangular lattice of the PhC region. Semi-circle 36 in the upper half-space indicates the allowed wave vector in the waveguide region (core 12 and cladding 14). Since no possible mode exists in the PhC region, there is nothing in the lower half-space. Solid arrows 38 show the incident and reflected light propagation directions, while the grating vector associated with the periodicity of the boundary of the core and PhC region is represented by dashed arrows 40, and an allowed diffraction order direction is indicated as dotted line 42. For a forty-five-degree angle of incidence of the waveguide mode upon the PhC region boundary, there is not only a reflected portion of the signal but also a diffracted portion of the signal propagating at an angle of approximately thirty degrees with respect to the incident signal. As shown in FIG. 9 as well as FIG. 8, then, diffraction at the PhC boundary restricts the bend efficiency of this waveguide assembly 10.

By modifying the boundary layer of the PhC region 16 (i.e. the first layer of air holes) at the incidence surface 16a of the PhC region, the diffraction effect caused by the periodicity of the boundary can be manipulated. In this regard, a micro-genetic algorithm ($\mu$GA) combined with a 2D FDTD technique can be implemented to maximize the bend efficiency for $\lambda$=1.55 $\mu$m. The radius, periodicity, and/or position of the air holes of the boundary layer can be allowed to change in the optimization process. FIG. 10 illustrates the bend efficiency as a function of wavelength before and after $\mu$GA optimization. As shown, optimizing or otherwise modifying the boundary layer of the PhC region, such as in accordance with the $\mu$GA, clearly results in a significantly improved bend efficiency at a wavelength of 1.55 $\mu$m.

The geometry of an optimized wavelength assembly 10 and the magnitude squared time averaged magnetic field for $\lambda$=1.55 $\mu$m are shown in FIG. 11. The radius and periodicity of the air holes of the boundary layer of the PhC region 16 can remain the same as before (e.g., r=0.198 $\mu$m, a=0.495 $\mu$m). The position of the boundary layer, however, is shifted further into the core 12 at the intersection of the input channel 12a and output channel 12b, such as by 0.566 $\mu$m as shown in FIG. 11. As can be seen, shifting the boundary layer creates a small gap between the boundary layer and the remaining layers of the PhC region. In turn, destructive multiple beam interference for the diffracted light caused by such a gap suppresses the undesired diffraction order and increases the bend efficiency significantly, such as from 56.2% to 92.5%.

3. High Refractive Index Core/Low Refractive Index, Square PhC Region and TM Polarized Signals As explained above, in one exemplar embodiment, the core 12 has a relatively high refractive index with the core and cladding having a relatively low refractive index contrast, and the PhC region 16 comprises, for example, a square or triangular array of air holes having a relatively low refractive index. As also explained above, the signals 18 comprise TE polarized light. It should be understood, however, that the signals can equally comprise TM polarized light. Reference is now made to FIG. 12, which illustrates the dispersion relation of such a square lattice PhC region, where the waveguide region (core and cladding 14) is again assumed to be quasi-homogeneous with an effective refractive index $n_{eff}$=3.239, and the signals comprise TM polarized light. As shown in FIG. 12, such a PhC region has a $\Gamma$-M directional photonic band gap in the range of normalized frequencies between 0.214($a/\lambda_0$) and 0.251($a/\lambda_0$) for r/a=0.39. In this regard, the PhC region has a directional band gap wide enough to create a high efficiency waveguide bend. As before, r represents the radius of the air holes of the PhC region, a represents the lattice constant or periodicity of the PhC region, and $\lambda_0$ represents the wavelength in vacuum. Based on a waveguide assembly 10 having such an arrangement, consider a normalized frequency near the center of the photonic band gap shown in FIG. 12. For $\lambda_0=1.55$ µm, the square lattice PhC region has a radius r=0.141 µm and a periodicity a=0.362 µm.

It should be noted that the boundary between the PhC region 16 and the waveguide region of the arrangement producing the dispersion relation of FIG. 12 corresponds to the Γ-X direction of the first Brillouin zone of the PhC region, as opposed to the Γ-M direction for the waveguide assembly 10 shown in FIG. 1, which corresponds to a low refractive index core. In this regard, use of the Γ-X direction as a boundary instead of the Γ-M direction presents a shorter period interface to the incident light, which decreases the number of possible propagating (i.e., non-evanescent) diffraction orders. Decreasing the number of possible propagating diffraction orders can be a particularly important consideration for a high refractive index core in which the wavelength of light in the medium is substantially smaller than for a low refractive index core.

The magnitude squared time averaged electric field for such a waveguide assembly 10 at $\lambda=1.55$ µm, which can be determined from the 2D FDTD technique with Berenger perfectly matched layer boundary conditions, is shown in FIG. 13. From FIG. 13, it can be seen that such a waveguide configuration produces a bend efficiency of approximately 72.0%. In this regard, a portion of the incident signal is deflected backward toward the input channel 12a of the core 12, while another portion of the incident signal propagates into the PhC region 16. The wave vector diagram for this waveguide assembly is shown in FIG. 14.

Semi-circle 42 in the upper half-space of FIG. 14 indicates the allowed wave vectors in the waveguide region, and dotted curves 44 in the lower half space denote the allowed modes in the PhC region 16. As can be shown, there are two allowed diffraction orders from diffraction by the periodic PhC region boundary. One of these diffraction orders propagates back toward the input channel 12a, nearly along the incident signal path, and the other allowed diffraction order couples to a PhC mode. And as will be appreciated, the existence of these two diffraction orders limits the maximum bend efficiency that can be achieved by the waveguide assembly 10. To increase the bend efficiency of such as waveguide assembly, then, the µGA can be used to optimize the waveguide assembly for improved bend efficiency.

In optimizing the waveguide assembly 10, the radius, periodicity and/or position of the boundary layer air holes of the PhC region 16, and/or the size of the air holes of the PhC region can be allowed to change. The maximum size of the air holes in the boundary layer and the remaining PhC region can be restricted such that the walls (i.e., edge to edge separation of two adjacent holes) have a minimum allowable size, such as 75 nm. Results for before and after µGA optimization are shown as the dotted and dashed lines, respectively, in FIG. 15. As can be seen, by optimizing the PhC region, the bend efficiency at the wavelength $\lambda=1.55$ µm can be improved significantly (95.0%), with a range of wavelengths between 1.5133 µm and 1.5773 µm, and between 1.593 µm and 1.6067 µm, for which the bend efficiency is greater than 90%.

Although the optimization has been shown and described for only the wavelength $\lambda=1.55$ µm, it should be understood that a significant improvement of the bend efficiency can be obtained at any of a number of different wavelengths, such as at any of a number of wavelengths over the wavelength range shown in FIG. 15. It should be noted, however, that the peak bend efficiency is not at the wavelength $\lambda=1.55$ µm for such a wavelength assembly 10. In this regard, restricting the wall size to a minimum of 75 nm limits the possible size of air holes of the PhC region 16. Thus, such a waveguide assembly can be further optimized by increasing the size of air holes of the PhC region manually which, in turn, decreases the wall size. For exemplar results of such a manual optimization, see FIG. 15.

The geometry of the optimized wavelength assembly 10 and the magnitude squared time averaged electric field for $\lambda=1.55$ µm are shown in FIG. 16. As indicated above with respect to FIG. 12, the PhC region of such a waveguide assembly can comprise a square lattice of air holes having a radius r=0.141 µm and a periodicity a=0.362 µm. With the optimized wavelength assembly, however, the boundary layer can comprise air holes that have a radius and periodicity that differ from the radius and periodicity of the air holes of the remaining PhC region. For example, the boundary layer of the PhC region 16 can comprise air holes with a radius r=89.33 nm and a periodicity a=253.85 nm. In contrast, for example, the remaining PhC region can comprise air holes with a radius r=145 nm and a periodicity a=362 nm. The wall sizes of the boundary layer of the PhC region and the remaining PhC region can be, for example, 72 nm and 75.19 nm, respectively.

In addition to differing air hole sizes, the position of the boundary layer can be shifted further into the core 12 at the intersection of the input channel 12a and output channel 12b. As shown, for example, the boundary layer of the PhC region can be shifted in the −y direction, such as by 170.24 nm. With the geometry shown in FIG. 16, then, the bending efficiency at $\lambda=1.55$ µm can be improved to 97.43%.

B. Beamsplitter

Referring now to FIG. 17A and 17B, in accordance with another embodiment of the present invention, the waveguide assembly 10 can be configured to operate as a beamsplitter. In this regard, the core 12 of the waveguide region of this embodiment can include an input channel 12a and an output channel 12b that intersect at the location of splitting signals 18. In this regard, the output channel of this embodiment includes a first output channel 12b' and a second output channel 12b" for propagation of the split portions of a signal propagating through the input channel. As shown, for example, the input and first output channel can intersect at a straight (i.e., 180-degree) angle, and the input and second output channels can intersect at a ninety-degree angle. Thus, as also shown, the first and second output channels can intersect at a supplementary angle (e.g., ninety-degrees) to the angle of intersection of the input channel and second output channel.

As before, to direct signals propagating from the input channel 12a to the first and second output channels 12b', 12b", the waveguide assembly of this embodiment includes a PhC region 16 extending laterally through at least a portion of the core at the intersection of the input channel and first and second output channels. More particularly, the PhC region extends laterally through the core at the intersection such that a portion of the signals propagate from the input channel and through the PhC region toward the first output channel and, consistent with the law of reflection, another portion of the signals deflect off of the PhC region toward the second output channel. For example, for a ninety-degree angle of intersection of the input channel and the second output channel, the PhC region can extend laterally through the core at the intersection of the input channel and first and second output channels such that signals from the input channel are incident at a forty-five-degree angle on the incidence surface 16a of the PhC region.

In the embodiment of the waveguide assembly 10 shown in FIG. 17, the waveguide region can comprise, as indicated above with respect to the waveguide bend of FIG. 1 for example, a core 12 and cladding 14 having refractive indices $n_{core}$=1.500 and $n_{clad}$=1.465, respectively, for a refractive index contrast, a=2.3%. The PhC region 16 shown in FIG. 17 can comprise, for example, one or more layers of a lattice including a square or triangular array of posts 17 (e.g., silicon posts). As also indicated above with respect to the waveguide bend, the PhC region can have, for example, a lattice constant or periodicity a=380 nm, with the posts having a radius r=86.8 nm and a refractive index $n_{PhC}$=3.481. Further, for example, the fundamental waveguide mode can be sourced along an 8 μm wide line (not shown) centered on the input channel 12a of the core directed toward the PhC region, with signals 18 comprising TM polarized light.

Similar to the optical waveguide 10 of FIG. 1, using a technique, such as a 2D FDTD technique with Berenger perfectly matched layer boundary conditions, the optical properties of the waveguide configured as shown in FIG. 17 can be numerically evaluated. In this regard, FIG. 18 illustrates a plot of the efficiency with which signals are split toward the first and second output channels 12b', 12b" of the core 12 as a function of wavelength for a PhC region 16 comprising both one and two layers of a square lattice of silicon posts. As shown, at a wavelength λ=1.55 μm, the PhC region can be configured to yield equal splitting of the incident light into the first and second output channels. For a PhC region comprising a single layer of posts 17, for example, the fraction of the incident optical power directed toward each waveguide is 49.7% (for 99.4% total efficiency) (see line 46 for the first output channel and line 48 for the second output channel) and only 0.012% is reflected back into the input waveguide. For the double layer of posts, for example, 50.2% of the incident light is directed toward the first output waveguide (see line 50), 49.2% into the second output waveguide (see line 52) (for, again, 99.4% total efficiency), and 0.05% is reflected.

As also shown in FIG. 18, the ratio of power split between the first and second output channels 12b', 12b" for a PhC region 16 including a single layer of posts is typically less sensitive to wavelength changes. Generally, then, the wavelength assembly 10 of the configuration generating the power split of FIG. 18, can function as a subwavelength diffraction grating for which all of the diffraction orders, except the reflected and transmitted zero orders, are typically evanescent. In addition, the diffraction grating is typically tuned to direct equal power into the reflected and transmitted zero orders.

As will be appreciated, in lieu of a PhC region 16 comprising posts 17, the PhC region can comprise air holes. Consider, then, a waveguide assembly 10 configured to operate as a beamsplitter, where the waveguide region includes a 2 μm wide core 12 having a refractive index $n_{core}$=3.250 and a cladding 14 having a refractive index $n_{clad}$=3.200, for a refractive index contrast Δ=1.54%. Also consider, the waveguide region as including a PhC region comprising a single layer of air holes with a periodicity a=268.7 nm and a radius r=105 nm. The spectral response for signals 18 comprising TM polarized light propagating through such a waveguide assembly is shown in FIG. 19. As shown, at λ=1.55 μm, 49.8% of incident light propagates through the PhC region toward the first output channel 12b', while 49.6% of incident light is deflected toward the second output channel 12b" (for a total efficiency of 99.4%). It is noted that spectral response of this configuration can be quite broad. Thus, the configuration generating the spectral response of FIG. 19 can generally function as a subwavelength diffraction grating that generates no propagating diffraction orders beyond the transmitted and deflected zero orders.

As yet another alternative, the PhC region 16 can include four layers of air holes with a periodicity a=255 nm and a radius r=180 nm. Consider, a waveguide assembly 10 including such a PhC region, where signals 18 comprising TE polarized light propagate through the waveguide assembly. The spectral response of such a waveguide assembly is shown in FIG. 20. As shown, at λ=1.55 μm, 50.6% of incident light propagates through the PhC region toward the first output channel 12b', while 48.2% of incident light is deflected toward the second output channel 12b" (for a total efficiency of 98.8%).

C. Polarizing Beamsplitter

While numerous techniques to developing waveguide polarizing beamsplitters have been developed, such techniques typically require relatively long waveguide structures to implement (~mm lengths). The waveguide assembly 10 of embodiments of the present invention, however, is capable of being configured to operate as a polarizing beamsplitter while occupying an area of only, for example, 15 μm×10 μm. A waveguide assembly configured to operate as a polarizing beam splitter in accordance with one embodiment of the present invention is shown in FIG. 21. Operating as a polarizing beamsplitter, signals incident on the incidence surface 16a of the PhC region 16 from the input channel 12a is split into portions that propagate toward the first and second output channels 12b', 12b" according to its polarization state. For example, the waveguide assembly 10 can be configured such that signals incident on the incidence surface of the PhC region are split into TE polarized light propagating toward the first output channel of the core, and TM polarized light propagating toward the second output channel. In the embodiment of the waveguide assembly 10 shown in FIG. 21, the waveguide region can comprise, for example, a core 12 and cladding 14 having the same characteristics as the waveguide assembly of FIG. 17.

The PhC region 16 shown in FIG. 21 can comprise, for example, a plurality of layers of a lattice including a square or triangular array of posts 17 (e.g., silicon posts). And as shown in FIG. 21, the boundary between the PhC region and the core of the waveguide region can be created by cuts in the Γ-M direction of the PhC region. To allow signals polarized in a given direction, as explained below, the portion of the core 12 through which the PhC region extends can be configured to follow the propagation direction of such polarized signals, as shown in FIG. 21. More particularly, a portion of the first output channel 12b' of the core, through which the PhC region extends, can be sloped such that the remaining portion of the first output channel is offset from the input channel 12a.

As shown in FIG. 22, the spectral response for both TM and TE polarized incident light during operation of the waveguide assembly 10 configured to operate as a polarizing beamsplitter can be evaluated, such as in a manner similar to before. As shown, a single mode source (not shown) can launch TM or TE polarized light into the input channel 12a of the core 12, and a Poynting vector calculation can be made to monitor the optical power in the first and second output channels 12b', 12b", where the output power can be divided by the incident power to obtain the efficiency with which light is directed toward the output channels. From FIG. 22, it can be shown that the waveguide assembly 10 effectively splits TM and TE polarizations to the output channels for a wide range of wavelengths. In this regard, the portion of the core through which the PhC region 16 extends can be configured to follow the propagation direction of TE polarized light. And as such, that respective portion can be shifted in a direction (i.e., −y direction) from the input channel, such as by 0.75 μm, as shown in FIG. 21.

The magnitude squared time averaged electric field and magnetic field for TM and TE polarized light at a wavelength λ=1.55 μm is shown in FIGS. 23A and 23B, respectively. As shown in FIG. 23A, TM polarized light can deflect off the incidence surface 16a of the PhC region 16 with 99.3% efficiency toward the second output channel 12b", while 0.06% of incident light propagates through the PhC region toward the first output channel 12b'. In the case of TE polarized light, as shown in FIG. 23B, 99.0% of the TE polarized light can propagate through the PhC region toward the first output channel, while 0.16% is deflected toward the second output channel. Also, as shown, the TM and TE output extinction ratios can be 28.0 dB and 32.2 dB, respectively.

Reference is now made to FIGS. 24A and 24B, which illustrate wave vector diagrams for TM and TE polarized light, respectively, at the wavelength λ=1.55 μm. As shown, the horizontal axes of the wave vector diagrams correspond to the Γ-M direction of the first Brillouin zone of the PhC region 16, which forms the incident interface of the PhC region at the incidence surface 16a. In this regard, the square and diamond insets in FIGS. 21 and 24, which indicate the first Brillouin zone of the PhC, show how the configuration of the waveguide assembly 10 can be related to the wave vector diagram. As shown in FIG. 24, solid semi-circles 54 in the upper half-space represent allowed wave vectors in the waveguide region (assuming the waveguide region is quasi-homogeneous with refractive index n=1.485), and dotted curves 56 represent the wave vectors of allowed propagation modes in the PhC region 16. The solid arrows 58 denote propagation directions of the incident, deflected, and refracted light. In this regard, the refracted light propagation direction in the PhC region is determined by the group velocity direction, which can calculated by the gradient of the dispersion surface. The grating vector associated with the periodicity at the boundary of the PhC region and the core 12 of the waveguide region can be represented by dashed arrows 60.

From FIG. 24A, it can be seen that there is no possible mode in the PhC region 16 for TM polarized light incident along the input waveguide at a forty-five degree angle with respect to the incidence surface 16a of the PhC region. Moreover, there are no allowed diffraction orders from diffraction by the periodic PhC boundary. Therefore, only zero order reflection is allowed for light incident upon the PhC boundary, and this reflected light deflects toward the second output channel 12b". On the other hand, TE polarized light at a forty-five degree incidence to the PhC boundary has a possible propagation mode in the PhC region, while there are still no allowed diffraction orders, as shown in FIG. 24B. Because the allowed wave vectors in the PhC region for TE polarization form a semi-circle, the PhC region can function as an effective isotropic material. The calculated effective refractive index from the wave vector diagram in FIG. 24B can be, for example, $n_{PhC}$=1.682. In this regard, this value is smaller than the effective index calculated by the area-weighted average index of the PhC region because the field propagating through the PhC region is localized primarily in the low index material.

Using the effective index and considering the PhC region 16 as an isotropic material, it can be shown that 99.0% of TE polarized light can be coupled into the first output channel 12b' of the core 12. In this regard, the Brewster angle for the PhC effective index can be calculated to equal 48.27°, which is close to the incident angle (i.e., 45-degrees) of signals to the PhC region. The reflections at both interfaces can therefore be very small (e.g., 0.001% for Fresnel deflection calculated with effective indices of the waveguide region (1.485) and PhC region (1.682)). Since the deflections at both interfaces are so small, high coupling efficiency into the first output channel for TE polarized light can be realized.

Polarizing beamsplitter performance can also be evaluated as a function of potential fabrication errors that affect the radius and periodicity of the posts 17 of the PhC region 16, and positional and angular misalignment of the PhC region with respect to the channels over the wavelength range between 1.53 μm and 1.62 μm (corresponding to C and L bands for optical communication). It can be shown that, for a variation in post radius from r=80.8 nm to r=90.8 nm (20 nm range for the diameter), the TM polarization efficiency can vary between 93.0% and 99.3%, while the corresponding range for the TE polarization efficiency can vary between 94.5% and 99.0%. At a wavelength of λ=1.55 μm, the efficiency for the TM polarized light at the second output channel 12b" can be in the range between 98.7% and 99.3%, while over 97.2% of TE polarized light can be coupled into the first output channel 12b'.

Likewise, it can be shown that the efficiencies of TM and TE polarized modes can be greater than 94% for changes in the periodicity of the PhC region 16 from 370 nm to 400 nm over the C and L bands. Also, the TM and TE efficiencies can be greater than 95% for ±0.5 μm misalignment of the PhC region in both the x and y directions. In this regard, a PhC region angular misalignment of greater than ±1° can be required before the TM efficiency drops to 95% over the wavelength range. Actual fabrication angular misalignment can, of course, be much smaller than a degree.

D. Bend/Beamsplitter Combinations

As will be appreciated, the waveguide assembly 10 can include more than one PhC region 16 for directing signals in the core 12 of the waveguide region in a number of different manners. In various embodiments, then, the configuration of the waveguide assembly operating as a waveguide bend (see FIG. 1) can be combined with the configuration of the waveguide assembly operating as a beamsplitter (see FIG. 17) in a number of different manners. For example, as shown in FIG. 25, the PhC region 16 from a waveguide assembly operating as a single layer beamsplitter can be combined with two PhC regions from waveguide assemblies operating as a waveguide bend to thereby form yet another configuration of the waveguide assembly, namely a Mach-Zender interferometer.

As will be appreciated by those skilled in the art, an interferometer can be generally defined as a device capable of splitting a signal into two parallel signals, each of which travel a fixed distance before both are recombined into a single signal. Thus, the Mach-Zender waveguide assembly 10 shown in FIG. 25 can include a PhC region 16 operating as a beamsplitter to thereby split a signal from the input channel 12a toward first and second intermediate channels 12c', 12c". The split signals can then propagate through interferometer legs where the signals can be redirected toward one another by means of a PhC region 16 extending laterally through at least a portion of the core of each of the first and second intermediate channels. The redirected signals can then be recombined by another PhC region configured to operate as a beamsplitter. As will be appreciated, varying the optical path lengths through the first and second intermediate channels by small changes in the position of the PhC regions operating as bend elements permits arbitrary power splitting between first and second output channels 12$b'$, 12$b''$. For example, FIG. 26 illustrates the magnitude squared time averaged electric field for signals of light having a wavelength of 1.55 μm. In such an instance, the fraction of the incident optical power that is directed toward the first output channel is 97.8%, while only 0.6% is coupled toward the second output channel and 0.08% is reflected back into the input channel.

As will also be appreciated, if a phase modulator (not shown) is introduced in one of the intermediate channels 12$c'$, 12$c''$, the overall interferometer footprint can be limited by the phase modulator length (such as for phase modulators with refractive index modulation of ~$10^{-2}$ or less). In this regard, the footprint can be limited by the phase modulator length rather than the size of the bend (PhC regions 16 operating as waveguide bends) and beamsplitting regions (PhC regions operating as beamsplitters) to offer a potential path to dramatically reduce the size of optical waveguide components and thereby permit the realization of compact, highly integrated photonic circuits.

In addition to being configured to operate as a Mach-Zender interferometer, the configuration of the waveguide assembly 10 operating as a waveguide bend can be combined with the configuration of the waveguide assembly operating as a beamsplitter to thereby form a ring resonator. As shown in FIG. 27, the waveguide assembly includes an input channel 12$a$, and a ring waveguide comprising first and second intermediate channels 12$c'$, 12$c''$. Consistent with a ring resonator, the waveguide assembly also includes a first output channel 12$b'$ operating as a drop port, and a second output channel 12$b''$ operating as a throughput port. It should be understood, however, that the first output channel can equally operate as the throughput port, with the second output channel operating as the drop port. As will be appreciated, then, various frequencies of the incident mode signals propagate toward the drop port, while incident mode signals having other frequencies propagate toward the throughput port.

FIGS. 28A and 28B illustrate the drop and throughput efficiencies, respectively, as a function of wavelength at each output channel 12$b'$, 12$b''$ (numerically calculated by, e.g., 2D FDTD). Dotted curves 62, dashed curves 64, and solid lines 66 represent the efficiencies for waveguide assemblies 10 operating as ring resonators where the PhC regions 16 operating as beamsplitters comprise a single array of posts (e.g., Si posts, r=100 nm), a dual array of posts (e.g., Si posts, r=95 nm), and a dual array of posts (e.g., Si posts, r=100 nm) with a higher bending ratio than that for the dual array of posts having r=95 nm, respectively.

As can be seen from FIGS. 28A and 28B, the waveguide assembly 10 of this embodiment drops some frequencies via the first output channel 12$b'$ operating as a drop port. As will be appreciated, then, the waveguide assembly operating as a ring resonator can be utilized to design other devices such as wavelength division multiplexers and/or demultiplexers, add/drop multiplexers, and many different types of wavelength filters. As will also be appreciated, ring resonator characteristics such as drop frequencies, drop efficiencies and drop frequency characteristics, including FWHM (full-width at half-maximum), Q-factor and free-spectral-range (FSR), can vary depending upon the specific configuration of the waveguide assembly. In this regard, the characteristics can be varied to thereby construct different types of ring resonators.

Irrespective of the configuration, the waveguide assembly 10 including the waveguide region and PhC region 16 can be fabricated in any of a number of different manners. In one embodiment, for example, the waveguide assembly can be configured by first coating a bottom layer of cladding 14 material on a wafer substrate, and thereafter coating a layer of core material on top of the bottom portion of the cladding. Thereafter, the core 12, including the input channel 12$a$ and output channel(s) 12$b$ can be patterned from the layer of core material, such as by a photolithography technique. At this point, the core can be patterned in a manner consistent with the desired configuration of the waveguide assembly such as into a waveguide bend, beamsplitter, polarizing beamsplitter, Mach-Zender interferometer, ring resonator or the like, as disclosed above.

After patterning the core 12, a top layer of cladding 14 material can be coated over the core such that the top and bottom layers of cladding material surround the core. The top layer of cladding material is then typically planarized, with the PhC region(s) thereafter patterned into the core and cladding such as in accordance with a photolithography technique. In this regard, holes can be etched through the waveguide region to thereby pattern the PhC region(s) consistent with the configuration of the waveguide assembly. Thereafter, if the PhC region(s) consist of posts 17, the holes can be filled with the material (e.g., Si) of such posts to thereby form the posts within the holes.

Thus, embodiments of the present invention provide an improved waveguide assembly that includes PhC region(s) capable of augmenting a waveguide region to reduce overall device size while preserving the traditional advantages of conventional waveguides. The waveguide assembly can advantageously be configured to operate as, for example, a high efficiency waveguide bend, beamsplitter, polarizing beamsplitter, Mach-Zender interferometer or a ring resonator. In contrast to conventional PhC waveguides, the PhC region(s) can extend through a portion of the core of the waveguide region, and can be capable of covering the incident light mode width of a signal propagating through the waveguide region. Also advantageously, the waveguide assembly of embodiments of the present invention can efficiently operate with signals outside the band gap of the PhC region(s).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A waveguide assembly comprising:
 a non-photonic crystal waveguide region comprising:
  a longitudinally extending core, wherein the core includes an input channel and at least one output channel; and
  a cladding surrounding the core for confining signals within the core; and
 at least one photonic crystal (PhC) region extending laterally through at least a portion of the core to at least partially direct signals propagating through the core.

2. A waveguide assembly according to claim 1, wherein the at least one PhC region extends laterally through at least a portion of the core to thereby form a bend for signals propagating through the core.

3. A waveguide assembly according to claim 2, wherein each PhC region includes a boundary layer at a boundary of the PhC region and the core of the waveguide region, and wherein the boundary layer is capable of being modified to thereby manipulate a diffraction effect caused by a periodicity at the boundary of the at least one PhC region and the core.

4. A waveguide assembly according to claim 3, wherein the boundary layer of each PhC region comprises an array of a plurality of one of holes and posts, and wherein the boundary layer is capable of being modified by changing at least one of a radius, periodicity and position of the one of holes and posts of the boundary layer.

5. A waveguide assembly according to claim 1, wherein the at least one PhC region extends laterally through at least a portion of the core to thereby form a beamsplitter for signals propagating through the core.

6. A waveguide assembly according to claim 5, wherein the at least one PhC region extends laterally through at least a portion of the core to thereby form a polarizing beamsplitter for signals propagating through the core.

7. A waveguide assembly according to claim 6, wherein a portion of the core through which the at least one PhC region extends can be configured to follow a propagation direction of polarized signals propagating through the core.

8. A waveguide assembly according to claim 7, wherein the at least one output channel comprises first and second output channels, and wherein a portion of the first output channel through which the PhC region extends is sloped with respect to the input channel.

9. A waveguide assembly according to claim 1, wherein the at least one PhC region extends laterally through at least a portion of the core to thereby form a Mach-Zender interferometer for signals propagating through the core.

10. A waveguide assembly according to claim 1, wherein the at least one PhC region extends laterally through at least a portion of the core to thereby form a ring resonator for signals propagating through the core.

11. A waveguide assembly according to claim 1, wherein the at least one PhC region further extends laterally through at least a portion of the cladding such that the at least one PhC region is capable of covering the incident light mode width of a signal propagating through the waveguide region.

12. A waveguide assembly according to claim 1, wherein signals having a wavelength outside a band gap of the at least one PhC region are capable of propagating through the core.

13. A waveguide assembly comprising:
a non-photonic crystal waveguide region including a longitudinally extending core; and
at least one photonic crystal (PhC) region extending laterally through at least a portion of the core to at least partially direct signals propagating through the core, wherein the signals are capable of having a wavelength outside a band gap of the at least one PhC region.

14. A waveguide assembly according to claim 13, wherein the at least one PhC region extends laterally through at least a portion of the core to thereby form a bend for signals propagating through the core.

15. A waveguide assembly according to claim 14, wherein each PhC region includes a boundary layer at a boundary of the PhC region and the core of the waveguide region, and wherein the boundary layer is capable of being modified to thereby manipulate a diffraction effect caused by a periodicity at the boundary of the at least one PhC region and the core.

16. A waveguide assembly according to claim 15, wherein the boundary layer of each PhC region comprises an array of a plurality of one of holes and posts, and wherein the boundary layer is capable of being modified by changing at least one of a radius, periodicity and position of the one of holes and posts of the boundary layer.

17. A waveguide assembly according to claim 13, wherein the at least one PhC region extends laterally through at least a portion of the core to thereby form a beamsplitter for signals propagating through the core.

18. A waveguide assembly according to claim 17, wherein the at least one PhC region extends laterally through at least a portion of the core to thereby form a polarizing beamsplitter for signals propagating through the core.

19. A waveguide assembly according to claim 18, wherein a portion of the core through which the at least one PhC region extends can be configured to follow a propagation direction of polarized signals propagating through the core.

20. A waveguide assembly according to claim 19, wherein the at least one output channel comprises first and second output channels, and wherein a portion of the first output channel through which the PhC region extends is sloped with respect to the input channel.

21. A waveguide assembly according to claim 13, wherein the at least one PhC region extends laterally through at least a portion of the core to thereby form a Mach-Zender interferometer for signals propagating through the core.

22. A waveguide assembly according to claim 13, wherein the at least one PhC region extends laterally through at least a portion of the core to thereby form a ring resonator for signals propagating through the core.

23. A waveguide assembly according to claim 13, wherein the waveguide region further includes a cladding at least partially surrounding the core for confining signals within the core, wherein the at least one PhC region further extends laterally through at least a portion of the cladding such that the at least one PhC region is capable of covering the incident light mode width of a signal propagating through the waveguide region.

24. A waveguide assembly comprising:
a non-photonic crystal waveguide region; and
at least one photonic crystal (PhC) region extending laterally through at least a portion of the waveguide region to at least partially direct signals propagating through the waveguide region, wherein the at least one PhC region extends laterally through at least a portion of the waveguide region such that the at least one PhC region is further capable of covering the incident light mode width of a signal propagating through the waveguide region.

25. A waveguide assembly according to claim 24, wherein the at least one PhC region extends laterally through at least a portion of the waveguide region to thereby form a bend for signals propagating through the waveguide region.

26. A waveguide assembly according to claim 25, wherein the waveguide region includes a longitudinally extending core, wherein each PhC region includes a boundary layer at a boundary of the PhC region and the core of the waveguide region, and wherein the boundary layer is capable of being modified to thereby manipulate a diffraction effect caused by a periodicity at the boundary of the at least one PhC region and the core.

27. A waveguide assembly according to claim 26, wherein the boundary layer of each PhC region comprises an array of a plurality of one of holes and posts, and wherein the boundary layer is capable of being modified by changing at least one of a radius, periodicity and position of the one of holes and posts of the boundary layer.

28. A waveguide assembly according to claim 24, wherein the at least one PhC region extends laterally through at least a portion of the waveguide region to thereby form a beamsplitter for signals propagating through the waveguide region.

29. A waveguide assembly according to claim 28, wherein the at least one PhC region extends laterally through at least a portion of the waveguide region to thereby form a polarizing beamsplitter for signals propagating through the waveguide region.

30. A waveguide assembly according to claim 29, wherein the waveguide region includes a longitudinally extending core, wherein a portion of the core through which the at least one PhC region extends can be configured to follow a propagation direction of polarized signals propagating through the core.

31. A waveguide assembly according to claim 30, wherein the core of the waveguide region includes an input channel and first and second output channels, and wherein a portion of the first output channel through which the PhC region extends is sloped with respect to the input channel.

32. A waveguide assembly according to claim 24, wherein the at least one PhC region extends laterally through at least a portion of the waveguide region to thereby form a Mach-Zender interferometer for signals propagating through the waveguide region.

33. A waveguide assembly according to claim 24, wherein the at least one PhC region extends laterally through at least a portion of the waveguide region to thereby form a ring resonator for signals propagating through the waveguide region.

34. A waveguide assembly according to claim 24, wherein signals having a wavelength outside a band gap of the at least one PhC region are capable of propagating through the waveguide region.

* * * * *